United States Patent
Sasaki et al.

(10) Patent No.: US 11,855,253 B2
(45) Date of Patent: *Dec. 26, 2023

(54) SOLID ELECTROLYTE AND ALL-SOLID SECONDARY BATTERY

(71) Applicant: TDK CORPORATION, Tokyo (JP)

(72) Inventors: Takashi Sasaki, Tokyo (JP); Tetsuya Ueno, Tokyo (JP); Gakuho Isomichi, Tokyo (JP)

(73) Assignee: TDK CORPORATION, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 16/490,861

(22) PCT Filed: Mar. 29, 2018

(86) PCT No.: PCT/JP2018/013477
§ 371 (c)(1),
(2) Date: Sep. 3, 2019

(87) PCT Pub. No.: WO2018/181823
PCT Pub. Date: Oct. 4, 2018

(65) Prior Publication Data
US 2020/0075994 A1    Mar. 5, 2020

(30) Foreign Application Priority Data

Mar. 30, 2017    (JP) .................... 2017-068912

(51) Int. Cl.
*H01M 10/00*    (2006.01)
*H01M 10/0562*    (2010.01)
(Continued)

(52) U.S. Cl.
CPC ......... *H01M 10/0562* (2013.01); *C01B 25/45* (2013.01); *H01M 10/0525* (2013.01); *C01P 2006/40* (2013.01); *H01M 2300/0068* (2013.01)

(58) Field of Classification Search
CPC ......... H01M 10/0562; H01M 10/0525; H01M 2300/0068; H01M 2300/0071;
(Continued)

(56) References Cited

U.S. PATENT DOCUMENTS 11,411,244 B2*    8/2022    Isomichi ........... H01M 10/0525
11,548,824 B2*    1/2023    Sasaki ................... C04B 35/488
(Continued)

FOREIGN PATENT DOCUMENTS

CN    102456919 A    5/2012
CN    104600356 A    5/2015
(Continued)

OTHER PUBLICATIONS

Jul. 3, 2018 Search Report issued in International Patent Application No. PCT/JP2018/013477.
(Continued)

*Primary Examiner* — Nicholas P D'Aniello
(74) *Attorney, Agent, or Firm* — Oliff PLC

(57) ABSTRACT

A solid electrolyte, in which an occupied impurity level that is formed by a part of elements contained in a mobile ion-containing material being substituted and that is occupied by electrons is included in a band gap of the mobile ion-containing material, and an amount of charge retention per composition formula of the occupied impurity level is equal to or greater than an amount of charge retention of mobile ions per composition formula of the mobile ion-containing material.

5 Claims, 18 Drawing Sheets

(51) Int. Cl.
*C01B 25/45* (2006.01)
*H01M 10/0525* (2010.01)

(58) Field of Classification Search
CPC ...... H01M 10/052; C01B 25/45; C01B 25/30; C01P 2006/40; Y02E 60/10; H01B 1/08; H01B 1/06
See application file for complete search history.

(56) References Cited

U.S. PATENT DOCUMENTS

| | | |
|---|---|---|
| 2010/0028782 A1 | 2/2010 | Inda |
| 2011/0244337 A1 | 10/2011 | Ohta et al. |
| 2012/0231350 A1 | 9/2012 | Nishida et al. |
| 2012/0308900 A1 | 12/2012 | Ogasa |
| 2012/0328959 A1* | 12/2012 | Hayashi ............ H01M 10/0525 429/319 |
| 2013/0273437 A1 | 10/2013 | Yoshioka et al. |
| 2014/0134504 A1* | 5/2014 | Brown ................ H01M 8/1004 429/403 |
| 2014/0197351 A1* | 7/2014 | Balagopal .......... C04B 35/6261 252/62.2 |
| 2015/0064576 A1 | 3/2015 | Aitken et al. |
| 2015/0118573 A1 | 4/2015 | Yokoyama et al. |
| 2015/0333366 A1 | 11/2015 | Sato et al. |
| 2016/0141716 A1 | 5/2016 | Ito et al. |
| 2016/0164135 A1 | 6/2016 | Fasching et al. |
| 2019/0067736 A1 | 2/2019 | Yoshioka et al. |
| 2021/0036362 A1* | 2/2021 | Ueno ................ H01M 10/052 |

FOREIGN PATENT DOCUMENTS

| | | |
|---|---|---|
| EP | 3428929 A1 | 1/2019 |
| JP | H02-250264 A | 10/1990 |
| JP | H03-081908 A | 4/1991 |
| JP | H04-160011 A | 6/1992 |
| JP | H05-299101 A | 11/1993 |
| JP | 2001-143754 A | 5/2001 |
| JP | 2010-202499 A | 9/2010 |
| JP | 2010-272344 A | 12/2010 |
| JP | 2011-070939 A | 4/2011 |
| JP | 2012-246196 A | 12/2012 |
| JP | 2013-149493 A | 8/2013 |
| JP | 2014-229579 A | 12/2014 |
| JP | 2015-049981 A | 3/2015 |
| JP | 2015-065022 A | 4/2015 |
| JP | 2015-076324 A | 4/2015 |
| JP | 2015-216220 A | 12/2015 |
| JP | 2015-216221 A | 12/2015 |
| JP | 2016-001595 A | 1/2016 |
| JP | 2016-051539 A | 4/2016 |
| WO | 2012/008422 A1 | 1/2012 |
| WO | 2017/154922 A1 | 9/2017 |

OTHER PUBLICATIONS

Jun. 12, 2018 Search Report issued in International Patent Application No. PCT/JP2018/013452.
Jun. 3, 2020 Office Action issued in Chinese Patent Application No. 201880021434.6.
Apr. 14, 2021 Office Action Issued in U.S. Appl. No. 16/491,036.
Jul. 3, 2018 International Search Report issued in International Patent Application No. PCT/JP2018/013486.
Mar. 19, 2021 U.S. Office Action issued U.S. Appl. No. 16/497,624.
Jul. 23, 2021 Office Action Issued in U.S. Appl. No. 16/497,624.
Jun. 5, 2018 International Search Report issued in International Patent Application No. PCT/JP2018/013139.
Apr. 2, 2021 Office Action issued in U.S. Appl. No. 16/490,940.
Jun. 23, 2021 U.S. Office Action issued U.S. Appl. No. 16/490,940.
U.S. Appl. No. 16/490,940, filed Sep. 4, 2019 in the name of Isomichi et al.
U.S. Appl. No. 16/491,036, filed Sep. 4, 2019 in the name of Sasaki et al.
U.S. Appl. No. 16/497,624, filed Sep. 25, 2019 in the name of Sasaki et al.
Aug. 3, 2021 Office Action Issued in U.S. Appl. No. 16/491,036.
Nov. 18, 2021 Office Action issued in U.S. Appl. No. 16/491,036.
Translation of Feb. 18, 2022 Office Action issued in Chinese Application No. 201880021650.0.
Feb. 25, 2022 Advisory Action issued in U.S. Appl. No. 16/491,036.
Dec. 10, 2021 Office Action issued in U.S. Appl. No. 16/490,940.
Translation of Sep. 21, 2021 Office Action issued in Japanese Application No. 2019-510194.
Translation of Sep. 21, 2021 Office Action issued in Japanese Application No. 2019-510197.
Nov. 30, 2021, Non-Final Office Action Issued in U.S. Appl. No. 16/497,624.
Apr. 5, 2022 Office Action Issued in U.S. Appl. No. 16/497,624.
Apr. 11, 2022 Office Action Issued In U.S. Appl. No. 16/491,036.
Translation of Mar. 18, 2022 Office Action issued in Chinese Application No. 201880021444.X.
Translation of Mar. 22, 2022 Office Action issued in German Application No. 112018001797.4.
Translation of Mar. 23, 2022 Office Action issued in German Application No. 112018001738.9.
Translation of Mar. 22, 2022 Office Action issued in German Application No. 112018001798.2.
Jan. 6, 2023 Notice of Reasons for Revocation issued in Japanese Application No. 2019-510197.
Katsuhiro Nomura, "Research on Zirconium Phosphate-based Solid Electrolytes", Mar. 23, 1993.
Homepage of KOBELCO Research Institute, "Test preparation/ evaluation of oxide-based all-solid-state battery (PDF technical material)", https://kobelcokaken.co.jp/business/sb_prototype/oxide-based.pdf.
Adam Jolley et al, "Improving the ionic conductivity of NASICON through aliovalent cation substitution of Na3Zr2Si2PO12", Ionics 21, 3031-3038 (Jul. 2015).
Translation of Nov. 1, 2022 Office Action issued in Chinese Application No. 201880021650.0.
T. Asai et al, "Mixed Conductivity of Na1+4xMx11Fe2xIIIZr2—3xP3O12,M[]:Fe2+,Co2+ and Ni2+", Solid State Ionics 35, 319-322 (1989).
Translation of May 10, 2022 Office Action issued in Japanese Application No. 2019-510185.
Translation of Jun. 19, 2023 Notice of Reasons for Cancellation issued in Japanese Application No. 2019-510197 (Japan Patent No. 7040519).

\* cited by examiner

SOLID ELECTROLYTE AND ALL-SOLID SECONDARY BATTERY

TECHNICAL FIELD

The present invention relates to a solid electrolyte and an all-solid secondary battery.

The application is based upon and claims the benefit of priority from Japanese Patent Application No. 2017-068912, filed Mar. 30, 2017, the entire contents of which are incorporated herein by reference.

BACKGROUND ART

Using a non-retardant polymer electrolyte and an ionic liquid as electrolytes for batteries has been considered. However, both electrolytes contain organic substances, and it is thus impossible to eliminate concern regarding liquid leakage and ignition from batteries using these materials.

All-solid secondary batteries using ceramics as electrolytes are essentially non-combustible and are highly safe, and it is thus possible to eliminate concern regarding liquid leakage, liquid depletion, and the like. Therefore, all-solid secondary batteries have attracted attention in recent years.

As solid electrolytes for all-solid secondary batteries, various materials have been reported. For example, Patent Document 1 to 4 disclose technologies for realizing solid electrolytes with wide potential windows.

CITATION LIST

Patent Literature

[Patent Document 1]
Japanese Unexamined Patent Application, First Publication No. 2010-202499
[Patent Document 2]
Japanese Unexamined Patent Application, First Publication No. 2010-272344
[Patent Document 3]
Japanese Unexamined Patent Application, First Publication No. 2011-070939
[Patent Document 4]
Japanese Unexamined Patent Application, First Publication No. 2013-149493

SUMMARY OF INVENTION

Technical Problem

However, oxide solid electrodes cannot typically maintain electronic insulation when a potential is equal to or greater than 5 V. As a result, self-discharge is generated, and upper limits of operation potentials of the all-solid secondary batteries are lowered.

The invention was made in view of the aforementioned problems, and an object thereof is to provide a solid electrolyte with a potential window with a large upper limit.

Solution to Problem

The present inventors conducted intensive studies in order to solve the aforementioned problems.

As a result, the inventors discovered that it is possible to maintain electronic insulation and to prevent self-discharge by substituting a part of a zirconium phosphate-based solid electrolyte with an element with a variable valence because then it is possible to prevent electrons contained in an energy levels derived from zirconium or oxygen from being used for charge compensation at the time of charging and discharging. That is, the following means is provided in order to solve the aforementioned problems.

(1) According to a first aspect, there is provided a solid electrolyte, in which an occupied impurity level that is formed by a part of elements contained in a mobile ion-containing material being substituted and that is occupied by electrons is included in a band gap of the mobile ion-containing material, and the amount of charge retention per composition formula of the occupied impurity level is equal to or greater than the amount of charge retention of mobile ions per composition formula of the mobile ion-containing material.

(2) In the solid electrolyte according to the aforementioned aspect, the mobile ion-containing material may be a zirconium phosphate-based solid electrolyte, and a part of zirconium of the solid electrolyte may be substituted with at least one selected from the group consisting of V, Nb, Sb, Ta, and Bi or a part of phosphorous of the solid electrolyte may be substituted with at least one selected from the group consisting of Ge, Mo, W, Cr, Mn, Fe, Se, and Te.

(3) In the solid electrolyte according to the aforementioned aspect, it is preferable that the solid electrolyte be represented as a formula $Li_xTa_yZr_{2-y}M_zP_{3-z}O_{12}$, and that M be at least one selected from the group consisting of Cr, W, Mn, Fe, Ge, Se, and Te, and that on the assumption that the amount of Cr is zCr, the amount of W is zW, the amount of Mn is zMn, the amount of Fe is zFe, the amount of Ge is zGe, the amount of Se is zSe, the amount of Te is zTe, $z=zCr+zW+zMn+zFe+zGe+zSe+zTe$, $0 \le y<1$, $0 \le z<1.5$, and $y+zCr+zW+zMn \times 2+zFe \times 2+zGe+zSe+zTe \ge 1$ be satisfied (except for y=z=0).

(4) In the solid electrolyte according to the aforementioned aspect, it is preferable that $0 \le 1-y-zCr-zW-zMn \times 2-zFe \times 2-zGe-zSe-zTe \le x \le 1+y+zCr+zW \times 5+zMn \times 3+zFe \times 3+zGe \times 1+zSe \times 2+zTe \times 3$ be satisfied and that $y+zCr+zW+zMn \times 2+zFe \times 2+zGe+zSe+zTe \ge 1$ be satisfied (except for y=z=0).

(5) According to a second aspect, there is provided an all-solid secondary battery including: the solid electrolyte according to the aforementioned aspect.

(6) In the all-solid secondary battery according to the aforementioned aspect, a relative density of a pair of electrode layers and a solid electrolyte layer that has the solid electrolyte provided between the pair of electrode layers may be equal to or greater than 80%.

Advantageous Effects of Invention

The solid electrolyte according to the aforementioned aspects has a potential window with a large upper limit

DESCRIPTION OF EMBODIMENTS

Figure 1:
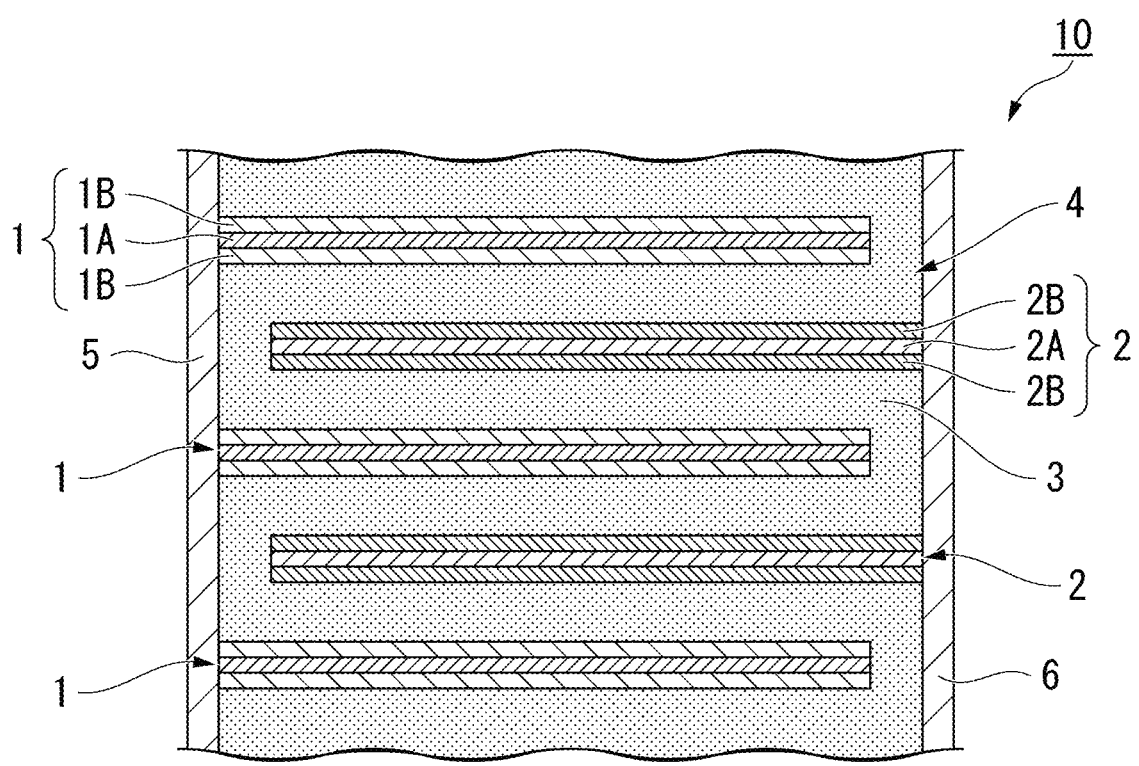
FIG. 1 is a schematic sectional view of an all-solid secondary battery according to a first embodiment.

Hereinafter, embodiments of the invention will be described in detail appropriately referring to drawings. The drawings used in the following description may show characteristic portions in an enlarged manner for convenience for easy understanding of features of the invention. Therefore, the dimensional ratios and the like of the respective components shown in the drawings may be different from actual dimensional ratios and the like. The materials, dimensions, and the like in the following description are just exemplary examples, and the invention is not limited thereto and can be appropriately modified and realized without changing the gist thereof.

[All-Solid Secondary Battery]

An all-solid secondary battery has at least one first electrode layer 1, at least one second electrode layer 2, and a solid electrolyte 3 that is interposed between the first electrode layer 1 and the second electrode layer 2. The first electrode layer 1, the solid electrolyte 3, and the second electrode layer 2 are laminated in this order and form a layered body 4. Each first electrode layer 1 is connected to a terminal electrode 5 disposed on one end side, and each second electrode layer 2 is connected to a terminal electrode 6 disposed on the other end side.

Any one of the first electrode layer 1 and the second electrode layer 2 functions as a positive electrode layer, and the other functions as a negative electrode layer. Hereinafter, the first electrode layer 1 is assumed to be a positive electrode layer 1, and the second electrode layer 2 is assumed to be a negative electrode layer 2 for easy understanding.

As shown in FIG. 1, the positive electrode layer 1 and the negative electrode layer 2 are alternately laminated via the solid electrolyte 3. The all-solid secondary battery 10 is charged and discharged by exchanging mobile ions between the positive electrode layer 1 and the negative electrode layer 2 via the solid electrolyte 3.

"Solid electrolyte"

The solid electrolyte 3 conducts ion between the positive electrode layer 1 and the negative electrode layer 2. The solid electrolyte 3 is an electronic insulator and is not conduct electron in principle. The electrons in the all-solid secondary battery due to charge and discharge are exchanged with an external circuit via the terminal electrode 5. If electronic insulation of the solid electrolyte 3 is low, the charged electrons are conducted through the solid electrolyte 3. If the electrons cause self-discharge in the solid electrolyte 3, fewer electrons are output to the outside during discharge, and a discharge capacity of the all-solid secondary battery 10 is lowered.

The solid electrolyte 3 according to the embodiment is adapted such that an occupied impurity level that is formed by a part of a constituent element being substituted and that is occupied by electrons is included in a band gap of the mobile ion-containing material, and the number of occupied impurity levels per composition formula is equal to or greater than an amount of charge retention of mobile ions per composition formula of the mobile ion-containing material.

With such a configuration, it is possible to maintain electronic insulation even if the entire mobile ions in the solid electrolytes are desorbed and thereby to raise an upper limit value of a potential window.

Any solid electrolyte 3 may be used as long as the aforementioned requirements are satisfied. For example, any of a zirconium phosphate-based solid electrolyte, a perovskite-type solid electrolyte, a NASICON-type solid electrolyte may be used. Also, any type of mobile ions may be employed, and any of alkali metals, alkaline earth metals, and other polyvalent ions may be employed.

Examples of the solid electrolyte that satisfy the predetermined requirements from among these solid electrolytes include a zirconium phosphate-based solid electrolyte. A zirconium phosphate-based solid electrolyte means a solid electrolyte in which phosphorous, zirconium, and oxygen form main portions of a basic skeleton. Representative examples thereof include $LiZr_2(PO_4)_3$ and also include partially substituted $LiZr_2(PO_4)_3$.

In the solid electrolyte 3, a part of phosphorus or zirconium contained in the solid electrolyte is substituted with another element.

Also, in the solid electrolyte 3 according to the embodiment, the element with which a part of phosphorus or zirconium is substituted is an element with a variable valence. If a part of phosphorous or zirconium is substituted with an element with a variable valence, it is possible to prevent electrons contained in an energy levels derived from zirconium and oxygen forming the basic skeleton from being used for charge compensation at the time of charging and discharging and thereby to maintain electronic insulation and preventing self-discharge. The following description will be given on the basis of specific examples.

FIGS. 2A to 2D are diagrams showing characteristics of a solid electrolyte in which a part of zirconium contained in the solid electrolyte is substituted with calcium that is a typical element with a valence that does not easily change. Specifically, FIGS. 2A to 2D show characteristics of the solid electrolyte represented as a formula $Li_{1+0.5x}V_{0.5}Zr_{1.5}(PO_4)_3$.

Figure 2A:
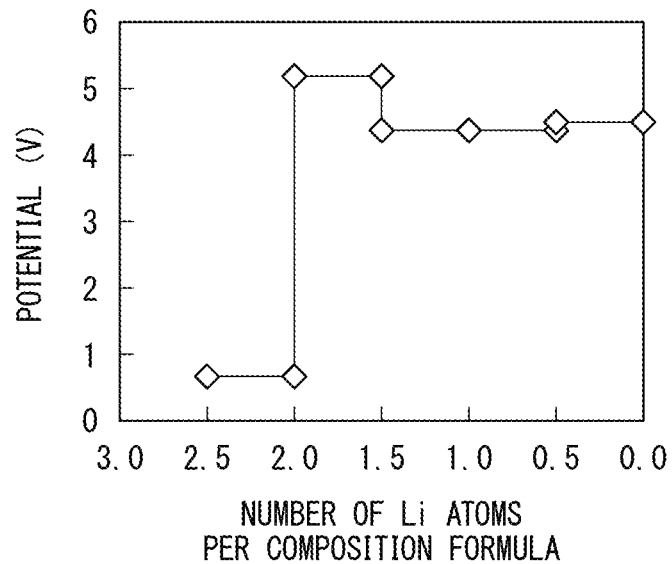
FIG. 2A is a diagram showing characteristics of a solid electrolyte in which a part of zirconium contained in the solid electrolyte is substituted with calcium that is a typical element.
Figure 2B:
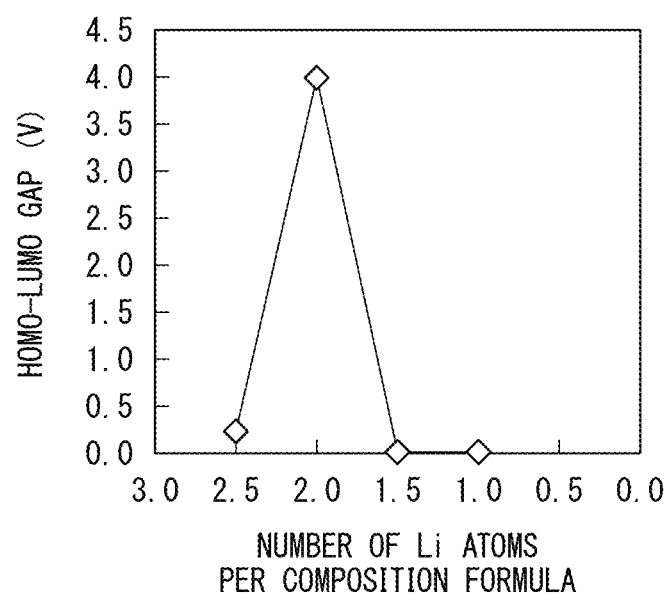
FIG. 2B is a diagram showing characteristics of a solid electrolyte in which a part of zirconium contained in the solid electrolyte is substituted with calcium that is a typical element.
Figure 2C:
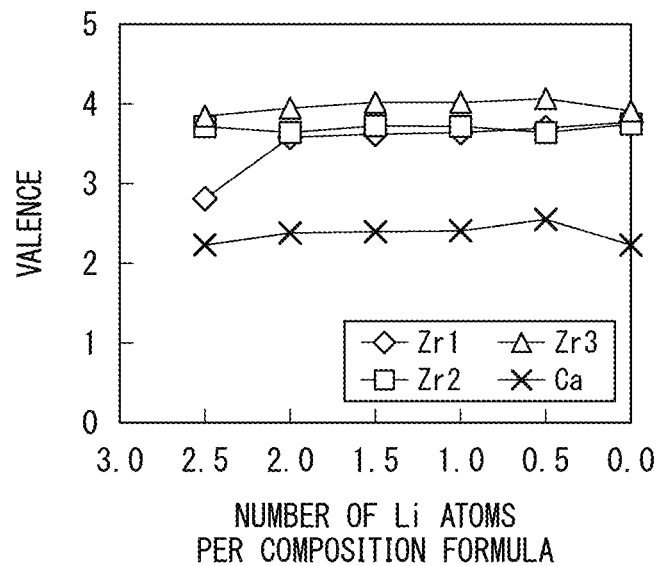
FIG. 2C is a diagram showing characteristics of a solid electrolyte in which a part of zirconium contained in the solid electrolyte is substituted with calcium that is a typical element.
Figure 2D:
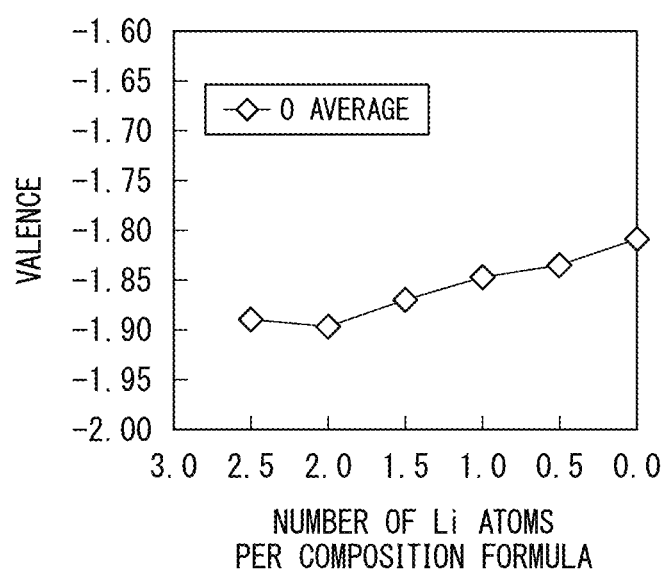
FIG. 2D is a diagram showing characteristics of a solid electrolyte in which a part of zirconium contained in the solid electrolyte is substituted with calcium that is a typical element.

FIG. 2A is a diagram showing a change in potential when the number of Li atoms per composition formula changes, FIG. 2B is a diagram showing a size of a highest occupied orbital (HOMO)-lowest unoccupied orbital (LUMO) gap of the solid electrolyte with respect to the number of Li atoms per composition formula, FIG. 2C is a diagram showing changes in valences of zirconium and calcium contained in the solid electrolyte when the number of Li atoms per composition formula changes, and FIG. 2D is a diagram showing a change in valence of oxygen contained in the solid electrolyte when the number of Li atoms per composition formula changes. Zr1, Zr2, and Zr3 mean sites where zirconium is present in a crystal structure.

In a case of substitution with calcium as shown in FIG. 2B, the HOMO-LUMO gap of the solid electrolyte suddenly decreases merely by the number of Li atoms per composition formula slightly deviating from 2.0. The fact that the HOMO-LUMO gap decreases means that it becomes more difficult for the solid electrolyte to maintain electronic insulation.

The HOMO-LUMO gap suddenly decreases because electrons derived from zirconium and oxygen forming the basic skeleton of the solid electrolyte are used for charge compensation at the time of charging and discharging. If the electrons derived from zirconium and oxygen forming the basic skeleton are used for charge compensation, carriers are supplied into the solid electrolyte, and the solid electrolyte cannot maintain electronic insulation.

It is possible to confirm from FIGS. 2C and 2D that electrons derived from zirconium and oxygen forming the basic skeleton of the solid electrolyte are used for charge compensation at the time of charging and discharging. In FIG. 2C, the valence of Zr1 suddenly changes substantially when the number of Li atoms contained in the solid electrolyte exceeds 2.0. Also, in FIG. 2D, the valence of oxygen changes substantially when the number of Li atoms contained in the solid electrolyte falls below 2.0. That is, it is possible to state that electrons derived from zirconium and oxygen are used for charge compensation at the time of charging and discharging. This leads to a decrease in electronic insulation.

The solid electrolyte in the all-solid secondary battery contributes to exchange of lithium ions between the positive electrode and the negative electrode. In addition, the electrons move between the positive electrode and the negative electrode via the terminal electrodes and external terminals. Since electrons to move between the positive electrode and the negative electrode via the terminal electrodes and the external terminals move through the solid electrolyte if it is not possible to maintain electronic insulation of the solid electrolyte, the all-solid secondary battery cannot maintain a charged state even if exchange of electrons with the external circuits is blocked.

The solid electrolyte in which a part of zirconium contained in the solid electrolyte is substituted with calcium that is a typical element can maintain electronic insulation only when the number of Li atoms per composition formula is about 2.0.

Meanwhile, FIGS. 3A to 3D are diagrams showing characteristics of the solid electrolyte 3 according to the embodiment. In the solid electrolyte 3, a part of zirconium is substituted with manganese with a variable valence. The solid electrolyte 3 described here is represented as a formula $Li_{1+0.5x}V_{0.5}Zr_{1.5}(PO_4)_3$.

Figure 3A:
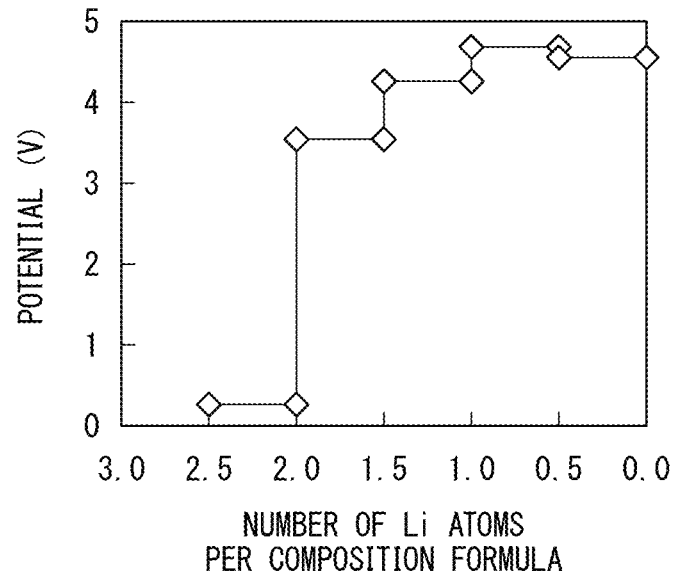
FIG. 3A is a diagram showing characteristics of a solid electrolyte according to the embodiment in which a part of zirconium contained in the solid electrolyte is substituted with manganese that is an element with a variable valence.
Figure 3B:
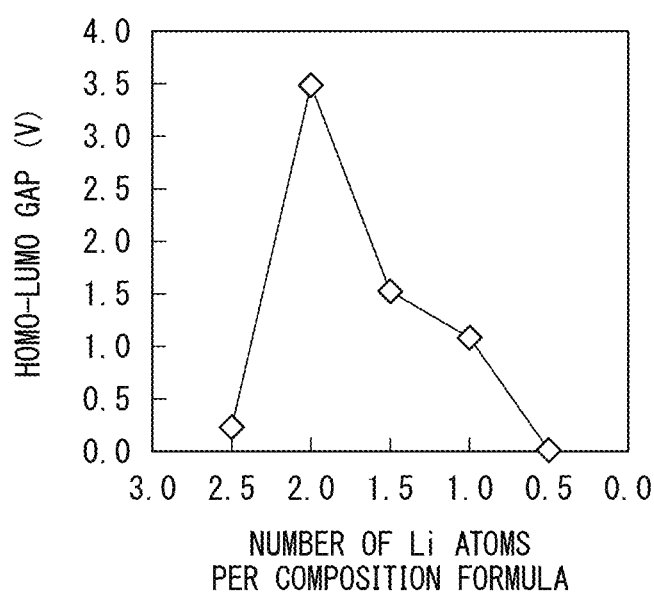
FIG. 3B is a diagram showing characteristics of a solid electrolyte according to the embodiment in which a part of zirconium contained in the solid electrolyte is substituted with manganese that is an element with a variable valence.
Figure 3C:
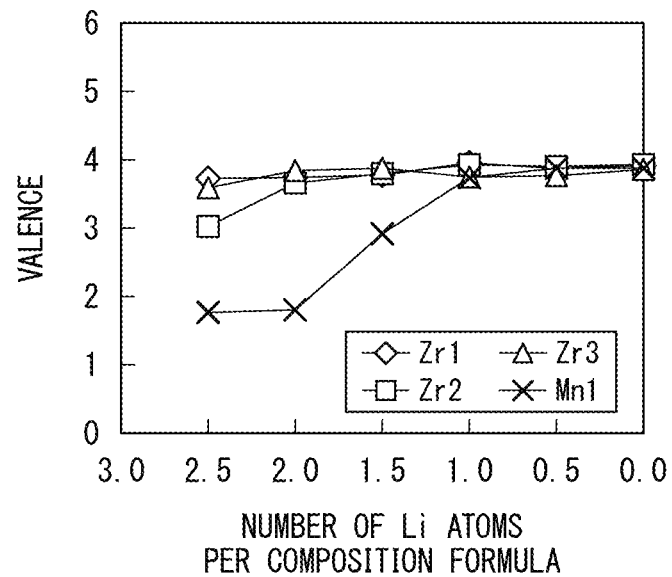
FIG. 3C is a diagram showing characteristics of a solid electrolyte according to the embodiment in which a part of zirconium contained in the solid electrolyte is substituted with manganese that is an element with a variable valence.
Figure 3D:
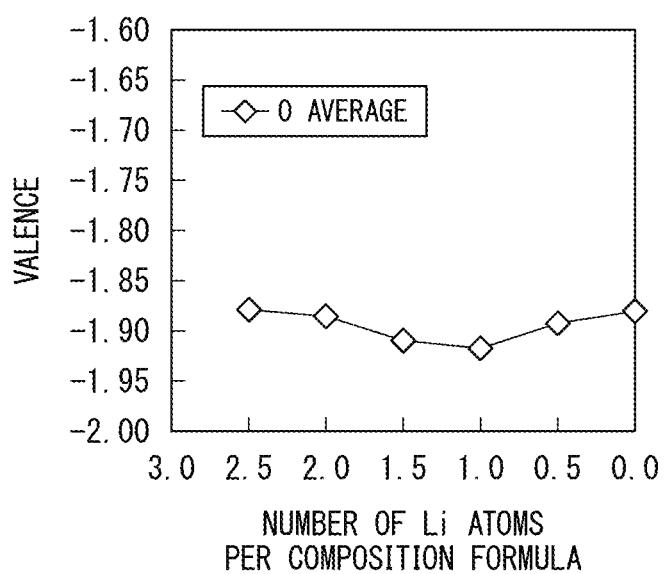
FIG. 3D is a diagram showing characteristics of a solid electrolyte according to the embodiment in which a part of zirconium contained in the solid electrolyte is substituted with manganese that is an element with a variable valence.

FIG. 3A is a diagram showing a change in potential when the number of Li atoms per composition formula changes, FIG. 3B is a diagram showing a size of a HOMO-LUMO gap of the solid electrolyte 3 with respect to the number of Li atoms per composition formula, FIG. 3C is a diagram showing changes in valences of zirconium and manganese contained in the solid electrolyte 3 when the number of Li atoms per composition formula changes, and FIG. 3D is a diagram showing a change in valence of oxygen contained in the solid electrolyte 3 when the number of Li atoms per composition formula changes.

In a case of substitution with manganese as shown in FIG. 3B, the solid electrolyte 3 maintains a HOMO-LUMO gap of equal to or greater than 0.5 eV in a wide range in which the number of Li atoms per composition formula is about 0.7 to about 2.4, and electronic insulation is maintained. This is because a substitution element with a variable valence contributes to charge compensation at the time of charging and discharging and prevents electrons in the energy levels derived from zirconium and oxygen forming the basic skeleton of the solid electrolyte 3 from being used for charge compensation at the time of charging and discharging.

In FIG. 3C, the valence of manganese significantly changes while valences of Zr1 to Zr3 do not significantly vary. Also, in FIG. 3D, the valence of oxygen does not also significantly vary. That is, since manganese with a variable valence is in charge of charge compensation and no carriers are supplied into the solid electrolyte 3, the solid electrolyte 3 can maintain insulation.

As a result, the all-solid secondary battery using the solid electrolyte 3 according to the embodiment can still maintain electronic insulation if the number of Li atoms per composition formula significantly changes.

Figure 4:
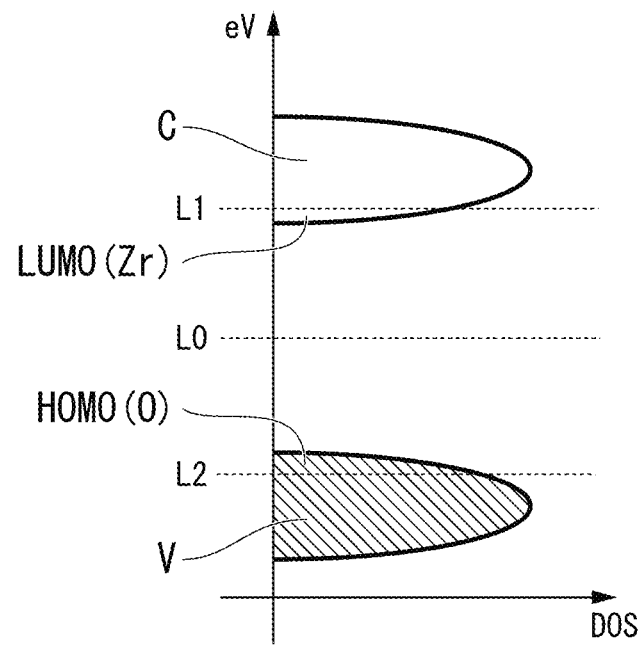
FIG. 4 is a schematic view of a band structure of a solid electrolyte substituted with a typical element.

The aforementioned details can be described as follows from a viewpoint of a band structure of a solid electrolyte. FIG. 4 is a schematic view of a band structure of a solid electrolyte substituted with a typical element. As shown in FIG. 4, the solid electrolyte substituted with a typical element has a valence band V and a conduction band C. The valence band V includes a level of an electron orbital derived from oxygen forming the basic skeleton of the solid electrolyte, and the conduction band C includes a level of an electron orbital derived from zirconium forming the basic skeleton of the solid electrolyte.

In the solid electrolyte shown in FIG. 4, a level L0 corresponding to a Fermi level is present between a LUMO level and a HOMO level when the number of Li atoms is a specific number (2.0 per composition formula in FIGS. 2A to 2D). In this case, a gap is present between the valence band V and the conduction band C, and the solid electrolyte maintains electronic insulation.

If Li is further added to the solid electrolyte from this case, the LUMO level receives electrons, and the level corresponding to the Fermi level moves from the position of L0 to the position of L1. Meanwhile, if Li comes out from the solid electrolyte, the HOMO level is oxidized. That is, holes enter the HOMO level, and the position of the Fermi level moves from the position indicated by the reference numeral L0 to the position indicated by the reference numeral L2. In both cases, the band structure is a metallic structure. As a result, electronic insulation of the solid electrolyte suddenly drops (FIG. 2B), and a range of the number of available Li becomes narrower (FIG. 2A).

Figure 5:
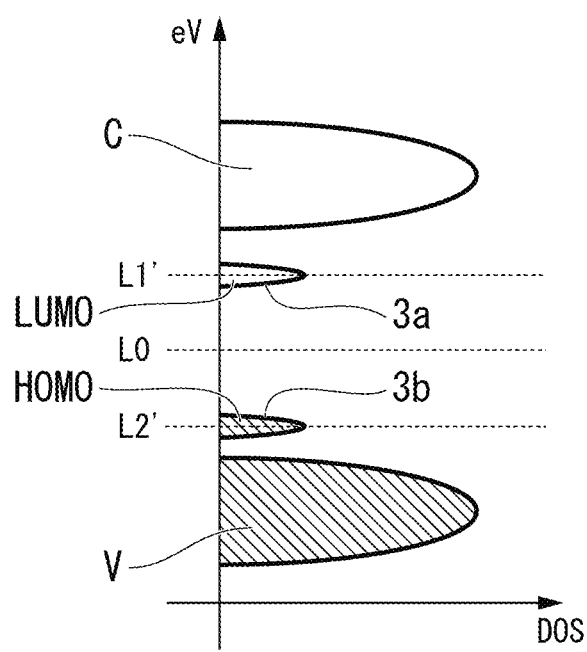
FIG. 5 is a schematic view of a band structure of a solid electrolyte 3 substituted with an element with a variable valence.

Meanwhile, FIG. 5 is a schematic view of a band structure of the solid electrolyte 3 according to the embodiment that is substituted with an element with a variable valence. As shown in FIG. 5, the solid electrolyte substituted with an element with a variable valence has at least one of an unoccupied impurity level 3a that is not occupied by electrons and an occupied impurity level 3b that is occupied by electrons in a band gap between the valence band V and the conduction band C.

As shown in FIG. 5, if Li intrudes into the solid electrolyte in a state in which the level corresponding to the Fermi level is present at the position indicated by the reference numeral L0, the unoccupied impurity level 3a is first reduced, and electrons enter the unoccupied impurity level 3a (the position of the Fermi level moves from the position indicated by the reference numeral L0 to the position indicated by the reference numeral L1'). Meanwhile, if electrons come off from the solid electrolyte in a situation where the Fermi level is present at the position indicated by the reference numeral L0, the occupied impurity level is first oxidized, and holes enter the occupied impurity level 3b (the position of the Fermi level moves from the position indicated by the reference numeral L0 to the position indicated by the reference numeral L2'). Therefore, an energy gap is kept between the unoccupied impurity level 3a and the LUMO level or between the occupied impurity level 3b and the HOMO level. As a result, the solid electrolyte 3 can maintain electronic insulation (FIG. 3B), and a range of the number of available LI becomes wider (FIG. 3A).

In the solid electrolyte according to the embodiment, the number of occupied impurity levels 3b per composition formula is equal to or greater than the amount of charge belonging to mobile ions per composition formula of the mobile ion-containing material. In this case, it is possible to trap all the added holes at the occupied impurity level 3b even if all the mobile ions are desorbed, to prevent holes from entering the valence band V, and thereby to maintain electronic insulation.

In this manner, the solid electrolyte 3 according to the embodiment can prevent electrons derived from zirconium and oxygen forming the basic skeleton from being used for charge compensation at the time of charging and discharging and keep electronic insulation by a part of phosphorous or zirconium being substituted with an element with a variable valence.

As an element with a variable valence with which a part of phosphorous or zirconium in the solid electrolyte 3 is substituted, at least one selected from the group consisting of V, Cr, Mn, Fe, Nb, Sb, Ta, Bi, Mo, Te, W, Ge, and Se can be used. If a part of phosphorous or zirconium is substituted with such these elements, it is possible to maintain electronic insulation since all of these elements have variable valences and it is not necessary to use electrons in the energy level derived from zirconium or oxygen for charge compensation at the time of charging and discharging.

In a case in which a part of zirconium is substituted with an element with a variable valence, the element with a variable valence is preferably at least one selected from the group consisting of V, Nb, Sb, Ta, and Bi. In a case in which a part of phosphorous is substituted with an element with a variable valence, the element with a variable valence is preferably at least one selected from the group consisting of Ge, Mo, W, Cr, Mn, Fe, Se, and Te.

If a part of zirconium or phosphorus in the solid electrolyte 3 is substituted with these elements, the unoccupied impurity level 3a and the occupied impurity level 3b are formed in gaps of the valence band V and the conduction band C, respectively.

As described above, electrons in the unoccupied impurity level 3a is used for charge compensation at the time of discharging, and electrons in the occupied impurity level 3b is used for charge compensation at the time of charging. The solid electrolyte 3 can maintain electronic insulation both at the time of charging and at the time of discharging by the solid electrolyte 3 having the unoccupied impurity level 3a and the occupied impurity level 3b with a satisfactory balance.

Specifically, the solid electrolyte 3 may be a compound represented as Formula (1) below:

$$\text{Li}_x\text{Ta}_y\text{Zr}_{2-y}\text{M}_z\text{P}_{3-z}\text{O}_{12} \text{ (on the assumption that the amount of Cr is } z\text{Cr, the amount of W is } z\text{W, the amount of Mn is } z\text{Mn, the amount of Fe is } z\text{Fe, the amount of Ge is } z\text{Ge, the amount of Se is } z\text{Se, and the amount of Te is } z\text{Te, } z=z\text{Cr}+z\text{W}+z\text{Mn}+z\text{Fe}+z\text{Ge}+z\text{Se}+z\text{Te, } 0\le y<1, 0\le z<1, y+z\text{Cr}+z\text{W}+z\text{Mnx}2+z\text{Fex}2+z\text{Ge}+z\text{Se}+z\text{Te}\ge 1) \quad (1).$$

Here, M is preferably at least one selected from the group consisting of Cr, W, Mn, Fe, Ge, Se, and Te.

On the assumption that the amounts of Cr, W, Mn, Fe, Ge, Se, and Te in M are zCr, zW, zMn, zFe, zGe, zSe, and zTe, the amounts preferably satisfy both Formulae (2) and (3) below:

$$0\le 1-y-z\text{Cr}-z\text{W}-z\text{Mnx}2-z\text{Fex}2-z\text{Ge}-z\text{Se}-z\text{Te}\le x\le 1+y+z\text{Cr}+z\text{Wx}5+z\text{Mnx}3+z\text{Fex}3+z\text{Gex}1+z\text{Sex}2+z\text{Tex}3 \quad (2)$$

$$y+z\text{Cr}+z\text{W}+z\text{Mnx}2+z\text{Fex}2+z\text{Ge}+z\text{Se}+z\text{Te}\ge 1 \quad (3)$$

<Positive Electrode Layer and Negative Electrode Layer>

As shown in FIG. 1, the positive electrode layer 1 has a positive electrode current collector layer 1A and a positive electrode active material layer 1B that contains a positive electrode active material. The negative electrode layer 2 has a negative electrode current collector layer 2A and a negative electrode active material layer 2B that contains a negative electrode active material.

The positive electrode current collector layer 1A and the negative electrode current collector layer 2A preferably have high electronic conductivity. Therefore, it is preferable to use, for example, silver, palladium, gold, platinum, aluminum, copper, nickel, and the like for the positive electrode current collector layer 1A and the negative electrode current collector layer 2A. Among these substances, copper does not easily react with the positive electrode active material, the negative electrode active material, and the solid electrolyte. Therefore, if copper is used for the positive electrode current collector layer 1A and the negative electrode current collector layer 2A, it is possible to reduce internal resistance of the all-solid secondary battery 10. Note that substances that are contained in the positive electrode current collector layer 1A and the negative electrode current collector layer 2A may be the same or different from each other.

The positive electrode active material layer 1B is formed on one surface or both surfaces of the positive electrode current collector layer 1A. In a case in which the positive electrode layer 1 out of the positive electrode layer 1 and the negative electrode layer 2 is formed in the uppermost layer of the layered body 4 in the lamination direction, for example, there is no facing negative electrode layer 2 on the positive electrode layer 1 located in the uppermost layer. Therefore, the positive electrode active material layer 1B may be provided only on one surface on the lower side of the positive electrode layer 1 located in the uppermost layer in the lamination direction.

The negative electrode active material layer 2B is also formed on one surface or both surfaces of the negative electrode current collector layer 2A similarly to the positive electrode active material layer 1B. Also, in a case in which the negative electrode layer 2 out of the positive electrode layer 1 and the negative electrode layer 2 is formed in the lowermost layer of the layered body 4 in the lamination direction, for example, the negative electrode active material layer 2B may be provided only on one surface on the upper side of the negative electrode layer 2 located in the lowermost layer in the lamination direction.

The positive electrode active material layer 1B and the negative electrode active material layer 2B contain a positive electrode active material and a negative electrode active material that exchange electrons, respectively. In addition to them, the positive electrode active material layer 1B and the negative electrode active material layer 2B may contain an electroconductive aid, a binder, and the like. The positive electrode active material and the negative electrode active material are preferably adapted such that mobile ions are efficiently inserted and desorbed.

For the positive electrode active material and the negative electrode active material, it is preferable to use, for example, a transition metal oxide or a transition metal composite oxide. Specifically, it is possible to use a lithium-manganese composite oxide $\text{Li}_2\text{Mn}_a\text{Ma}_{1-a}\text{O}_3$ (0.8≤a≤1, Ma=Co, Ni), lithium cobaltate ($\text{LiCoO}_2$), lithium nickelate ($\text{LiNiO}_2$), lithium manganese spinel ($\text{LiMn}_2\text{O}_4$), a composite metal oxide represented as $\text{LiNi}_x\text{Co}_y\text{Mn}_z\text{O}_2$ (x+y+z=1, 0≤x≤1, 0≤y≤1, 0≤z≤1), a lithium vanadium compound ($\text{LiV}_2\text{O}_5$), olivine-type $\text{LiMbPO}_4$ (where Mb is one or more kinds of element selected from Co, Ni, Mn, Fe, Mg, Nb, Ti, Al, and Zr), lithium vanadium phosphate ($\text{Li}_3\text{V}_2(\text{PO}_4)_3$ or $\text{LiVOPO}_4$), an Li excess solid solution represented as $\text{Li}_2\text{MnO}_3$—$\text{LiMcO}_2$ (Mc=Mn, Co, Ni), lithium titanate ($\text{Li}_4\text{Ti}_5\text{O}_{12}$), a composite metal oxide represented as $\text{Li}_s\text{Ni}_t\text{Co}_u\text{Al}_v\text{O}_2$ (0.9<s<1.3, 0.9<t+u+v<1.1), or the like.

There is no clear distinction between which is the positive electrode active materials or the negative electrode active materials that are included in the positive electrode active material layer 1B and the negative electrode active material layer 2B. It is possible to use a compound with a superior potential as a positive electrode active material and to use a compound with an inferior potential as a negative electrode active material by comparing potentials of two kinds of compound.

The positive electrode current collector layer 1A and the negative electrode current collector layer 2A may contain a positive electrode active material and a negative electrode active material, respectively. The amount of the active materials contained in the respective current collector layers is not particularly limited as long as the active materials function as current collectors. For example, the positive electrode current collector/the positive electrode active material or the negative electrode current collector/negative electrode active material falls within a range of 90/10 to 70/30 in terms of the volume ratio.

Adhesiveness between the positive electrode current collector layer 1A and the positive electrode active material layer 1B and between the negative electrode current collector layer 2A and the negative electrode active material layer 2B is improved by the positive electrode current collector layer 1A and the negative electrode current collector layer 2A containing the positive electrode active material and the negative electrode active material, respectively.

(Terminal Electrode)

The terminal electrodes 5 and 6 are formed such that they are in contact with side surfaces of the layered body 4 (surfaces from which the end surfaces of the positive electrode layer 1 and the negative electrode layer 2 are exposed) as shown in FIG. 1. The terminal electrodes 5 and 6 are connected to external terminals and are in charge of exchanging electrons with the layered body 4.

For the terminal electrodes 5 and 6, it is preferable to use a material with high electronic conductivity. For example, it is possible to use silver, gold, platinum, aluminum, copper, tin, nickel, gallium, indium, alloys thereof, or the like.

"Method for Manufacturing All-Solid Secondary Battery"

(Method for Manufacturing Solid Electrolyte)

The solid electrolyte 3 can be produced by a solid phase reaction method or the like. Specifically, the solid electrolyte 3 can be produced by mixing and sintering a compound containing phosphorous and zirconium forming the basic skeleton with a compound containing substituting element. The amount of substitution of elements to be substituted, substitution sites, and the like can be controlled by adjusting the molar ratio at the time of the mixing.

The composition of the solid electrolyte 3 can be checked using X-ray fluorescence analysis (XRF) or high-frequency inductively coupled plasma optical emission spectroscopy (ICP).

(Formation of Layered Body)

As a method for forming the layered body 4, a simultaneous sintering method may be used, or a sequential sintering method may be used.

The simultaneous sintering method is a method of laminating materials that form the respective layers and producing the layered body through collective sintering. The sequential sintering method is a method of producing the respective layers in order and performing a sintering process every time each layer is produced. It is possible to form the layered body 4 in a smaller number of operation processes in a case of using the simultaneous sintering method than in a case of using the sequential sintering method. Also, the obtained layered body 4 becomes denser in the case of using the simultaneous sintering method than in the case of using the sequential sintering method. Hereinafter, an exemplary case in which the layered body 4 is manufactured using the simultaneous sintering method will be described.

The simultaneous sintering method has a process of producing pastes of the respective materials that are included in the layered body 4, a process of applying the pastes to a base material and drying the pastes producing green sheets, a process of obtaining a layered sheet by laminating the green sheets and, a process of simultaneously sintering the layered sheet.

First, the respective materials for the positive electrode current collector layer 1A, the positive electrode active material layer 1B, the solid electrolyte 3, the negative electrode active material layer 2B, and the negative electrode current collector layer 2A that are included in the layered body 4 are prepared in the form of pastes.

A method of preparing the respective materials in the form of pastes is not particularly limited. For example, pastes may be obtained by mixing powder of the respective materials into vehicles. Here, the vehicles collectively refer to mediums in a liquid phase. The vehicles contain solvents and binders.

The paste for the positive electrode current collector layer 1A, the paste for the positive electrode active material layer 1B, the paste for the solid electrolyte 3, the paste for the negative electrode active material layer 2B, and the paste for the negative electrode current collector layer 2A are produced by such a method.

Then, green sheets are produced. The green sheets are obtained by applying the produced pastes to base materials such as polyethylene terephthalate (PET) films or the like, drying the pastes as needed, and peeling off the base materials. A method of applying the pastes is not particularly limited. For example, a known method such as screen printing, application, transferring, or a doctor blade can be employed.

Next, the respectively produced green sheets are stacked in accordance with a desired order and the number of layers to be laminated, thereby obtaining a layered sheet. When the green sheets are laminated, alignment, cutting, or the like is performed as needed. In a case in which a parallel or serial battery is produced, for example, it is preferable to perform alignment and stack the green sheets such that the end surface of the positive electrode current collector layer does not conform to the end surface of the negative electrode current collector layer.

The layered sheet may be produced using a method of producing a positive electrode active material layer unit and a negative electrode active material layer unit, which will be described later, and laminating the positive electrode active material layer unit and the negative electrode active material layer unit.

First, the paste for the solid electrolyte 3 is applied to a base material such as a PET film by a doctor blade method and is then dried, thereby forming the solid electrolyte 3 in the form of a sheet. Next, the paste for the positive electrode active material layer 1B is printed on the solid electrolyte 3 by screen printing and is then dried, thereby forming the positive electrode active material layer 1B. Then, the paste for the positive electrode current collector layer 1A is printed on the positive electrode active material layer 1B by screen printing and is then dried, thereby forming the positive electrode current collector layer 1A. Further, the paste for the positive electrode active material layer 1B is printed on the positive electrode current collector layer 1A by screen printing and is then dried, thereby forming the positive electrode active material layer 1B.

Thereafter, the PET film is peeled off, thereby obtaining the positive electrode active material layer unit. The positive electrode active material layer unit is a layered sheet in which the solid electrolyte 3, the positive electrode active material layer 1B, the positive electrode current collector layer 1A, and the positive electrode active material layer 1B are laminated in this order.

The negative electrode active material layer unit is produced in a similar procedure. The negative electrode active material layer unit is a layered sheet in which the solid electrolyte 3, the negative electrode active material layer 2B, the negative electrode current collector layer 2A, and the negative electrode active material layer 2B are laminated in this order.

Next, one positive electrode active material layer unit and one negative electrode active material layer unit are laminated. At this time, the positive electrode active material layer unit and the negative electrode active material layer unit are laminated such that the solid electrolyte 3 in the positive electrode active material layer unit is brought into contact with the negative electrode active material layer 2B in the negative electrode active material layer unit or the positive electrode active material layer 1B in the positive electrode active material layer unit is brought into contact with the solid electrolyte 3 in the negative electrode active material layer unit. In this manner, the layered sheet in which the positive electrode active material layer 1B, the positive electrode current collector layer 1A, the positive electrode active material layer 1B, the solid electrolyte 3, the negative electrode active material layer 2B, the negative electrode current collector layer 2A, the negative electrode active material layer 2B, and the solid electrolyte 3 are laminated in this order is obtained.

When the positive electrode active material layer unit and the negative electrode active material layer unit are laminated, the respective units are stacked in a deviating manner such that the positive electrode current collector layer 1A in the positive electrode active material layer unit extends only toward one end surface and the negative electrode current collector layer 2A in the negative electrode active material layer unit extends only toward the other surface. Thereafter, the sheet for the solid electrolyte 3 with a predetermined thickness is further stacked on the surface on a side on which the units are stacked and the solid electrolyte 3 is not present, thereby obtaining a layered sheet.

Next, the produced layered sheets are collectively pressure-bonded to each other. The pressure-bonding is preferably performed while the layered sheets are heated. The heating temperature at the time of the pressure-bonding is set to 40 to 95° C., for example.

Debinding is performed by heating the pressure-bonded layered sheet to 500° C. to 750° C. in a nitrogen, hydrogen, and water vapor atmosphere, for example. Thereafter, the layered sheet is collectively subject to simultaneous sintering, thereby obtaining the layered body 4 that is a sintered body. The sintering of the layered sheet is performed by heating the layered sheet to 600° C. to 1000° C. in a nitrogen, hydrogen, and water vapor atmosphere, for example. The sintering time is, for example, 0.1 to 3 hours.

In the layered body 4 that is a sintered body, relative density of the active material and the solid electrolyte may be equal to or greater than 80%. Mobile ion dispersion paths in a crystal are more easily connected, and ionic conductivity is enhanced as the relative density is higher.

In the layered body 4 that is a sintered body, an intermediate layer formed through element mutual dispersion may be included between the electrode layer and the solid electrolyte layer. It is possible to reduce the interface resistance between different materials by including the intermediate layer.

In the layered body 4 that is a sintered body, the electrolyte layer may have a core-shell structure that has a core region and a shell region with different metal ion concentrations or oxygen ion concentrations. It is possible to enhance electronic conductivity by having the core-shell structure.

The obtained sintered body (layered body 4) may be subject to barrel polishing by being placed in a cylindrical container along with a polishing material such as alumina. In this manner, it is possible to chamber corners of the layered body 4. In another method, the layered body 4 may be polished through sand blasting. This method is preferable since only a specific portion can be ground.

The terminal electrodes 5 and 6 are formed at ends of the layered body 4 produced in the aforementioned procedure, thereby producing the all-solid secondary battery. The terminal electrodes 5 and 6 can be produced by means such as sputtering.

As described above, the all-solid secondary battery according to the embodiment has a potential window with a large upper limit. The upper limit of the potential window is maintained to be high because it is not necessary to use electrons derived from oxygen for charge compensation even if entire Li is desorbed.

Although the embodiments of the invention have been described above in detail with reference to the drawings, the respective configurations, combinations thereof, and the like in the respective embodiments are just examples, and additions, omissions, replacements, and other modifications can be made without departing from the gist of the invention.

EXAMPLES

"Changes in Characteristics of Solid Electrolyte in Charging and Discharging"

As shown in FIGS. 2A to 2D and FIGS. 3A to 3D, characteristics of the solid electrolyte when the number of Li atoms per composition formula are caused to change were checked by measuring a potential of the solid electrolyte, a HOMO-LUMO gap of the solid electrolyte, and changes in valences of elements contained in the solid electrolyte. The measurement results corresponded to changes in characteristics of the solid electrolyte when the all-solid secondary battery was charged and discharged. These electron states can be measured by systematically examining the electron states through a UV-Vis spectrum or ultraviolet photoelectron spectroscopy (UPS) and inverse photoelectron spectroscopy (IPES) while changing compositions according to an experimental method. According to a simulation, the electron states can be measured by a first-principle simulation using a Vienna Ab initio Simulation Package (VASP), wien2k, PHASE, CASTEP, or the like. The electron states were measured through the first principle simulation using a Vienna Ab initio Simulation Package (VASP) this time.

Example 1-1

Figure 6A:
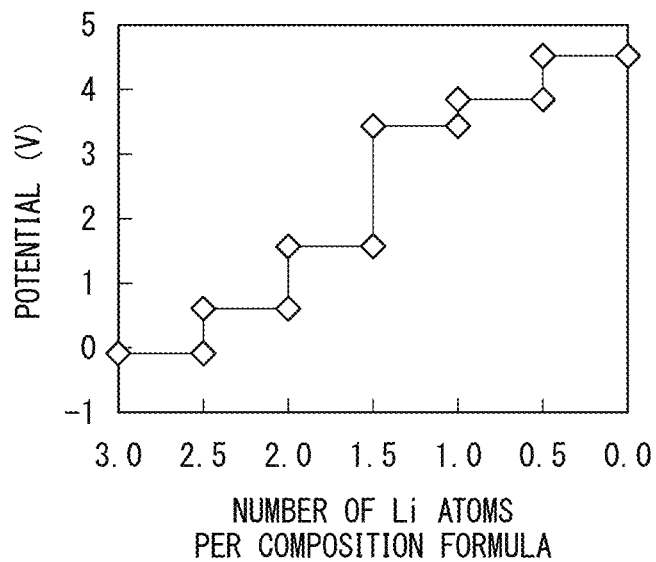
FIG. 6A is a diagram showing a measured change in characteristics of $Li_{1+0.5x}V_{0.5}Zr_{1.5}(PO_4)_3$ in which a part of zirconium in $LiZr_2(PO_4)_3$ is substituted with vanadium.
Figure 6B:
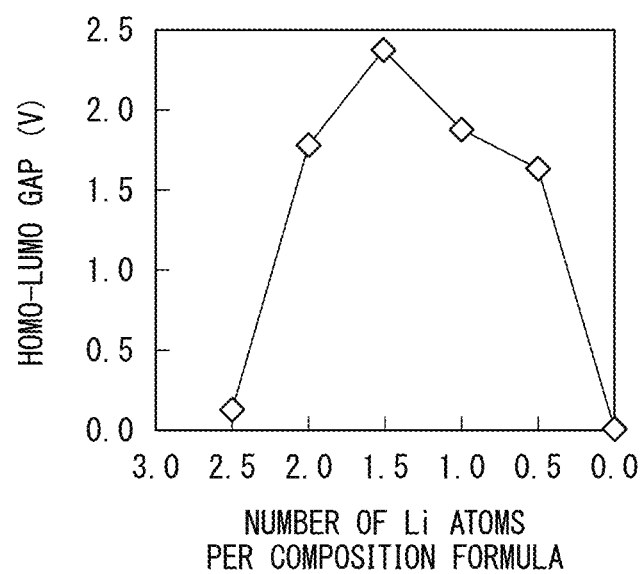
FIG. 6B is a diagram showing a measured change in characteristics of $Li_{1+0.5x}V_{0.5}Zr_{1.5}(PO_4)_3$ in which a part of zirconium in $LiZr_2(PO_4)_3$ is substituted with vanadium.
Figure 6C:
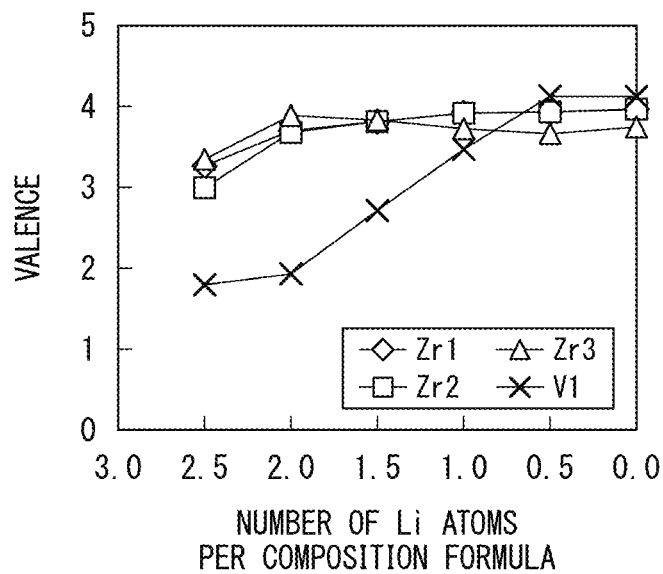
FIG. 6C is a diagram showing a measured change in characteristics of $Li_{1+0.5x}V_{0.5}Zr_{1.5}(PO_4)_3$ in which a part of zirconium in $LiZr_2(PO_4)_3$ is substituted with vanadium.
Figure 6D:
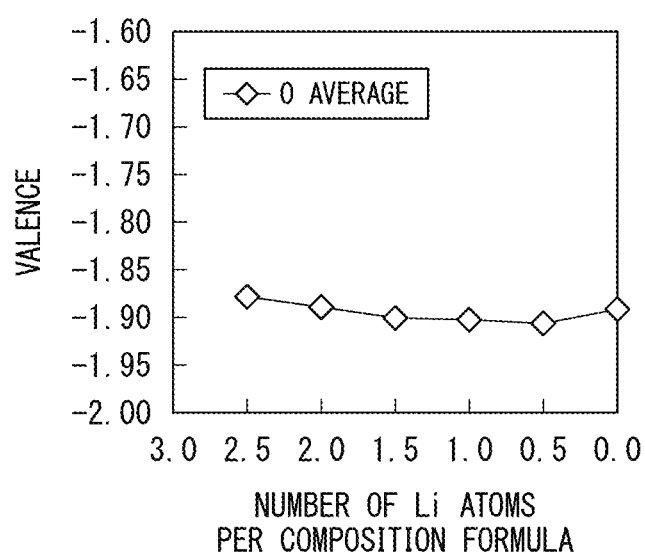
FIG. 6D is a diagram showing a measured change in characteristics of $Li_{1+0.5x}V_{0.5}Zr_{1.5}(PO_4)_3$ in which a part of zirconium in $LiZr_2(PO_4)_3$ is substituted with vanadium.

In Example 1-1, changes in characteristics of $Li_{1+0.5x}V_{0.5}Zr_{1.5}(PO_4)_3$ in which a part of zirconium of $LiZr_2(PO_4)_3$ was substituted with vanadium were measured. The results are shown in FIGS. 6A to 6D. FIG. 6A is a diagram showing changes in potential when the number of Li atoms per composition formula changed, FIG. 6B is a diagram showing the size of a HOMO-LUMO gap of the solid electrolyte with respect to the number of Li atoms per composition formula, FIG. 6C is a diagram showing changes in valences of zirconium and vanadium contained in the solid electrolyte when the number of Li atoms per composition formula changed, and FIG. 6D is a diagram showing a change in valence of oxygen contained in the solid electrolyte when the number of Li atoms per composition formula changed.

As shown in FIG. 6B, the solid electrolyte maintained electronic insulation within a wide range of the number of Li atoms from about 0.2 to about 2.3 in a case in which a part of zirconium was substituted with vanadium. This was also able to be confirmed from the fact that the valences of zirconium and oxygen shown in FIGS. 6C and 6D did not significantly change with respect to variations in the number of Li atoms.

Example 1-2

Figure 7A:
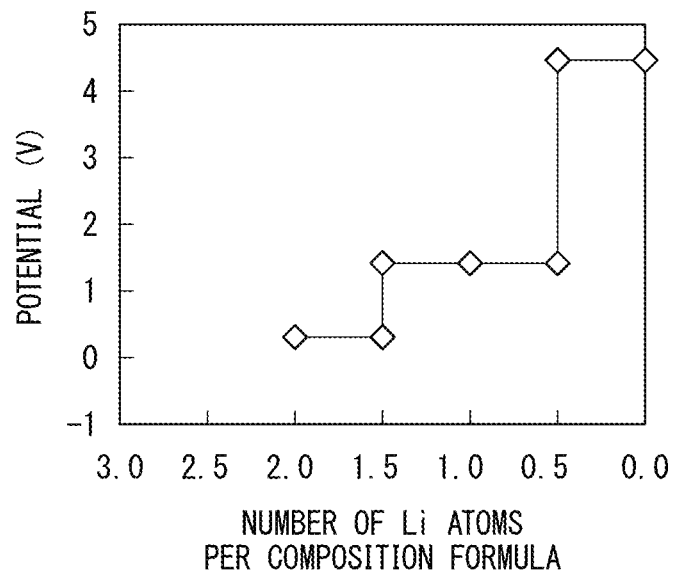
FIG. 7A is a diagram showing a measured change in characteristics of $Li_{1+0.5x}V_{0.5}Zr_{1.5}(PO_4)_3$ in which a part of zirconium in $LiZr_2(PO_4)_3$ is substituted with tantalum.
Figure 7B:
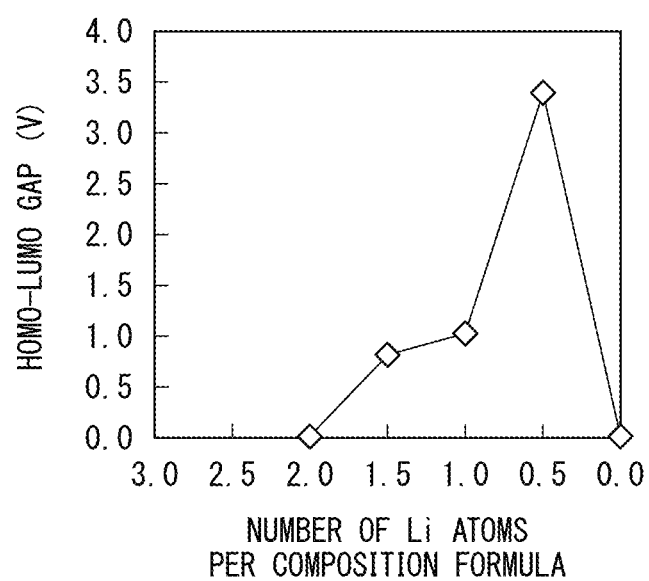
FIG. 7B is a diagram showing a measured change in characteristics of $Li_{1+0.5x}V_{0.5}Zr_{1.5}(PO_4)_3$ in which a part of zirconium in $LiZr_2(PO_4)_3$ is substituted with tantalum.
Figure 7C:
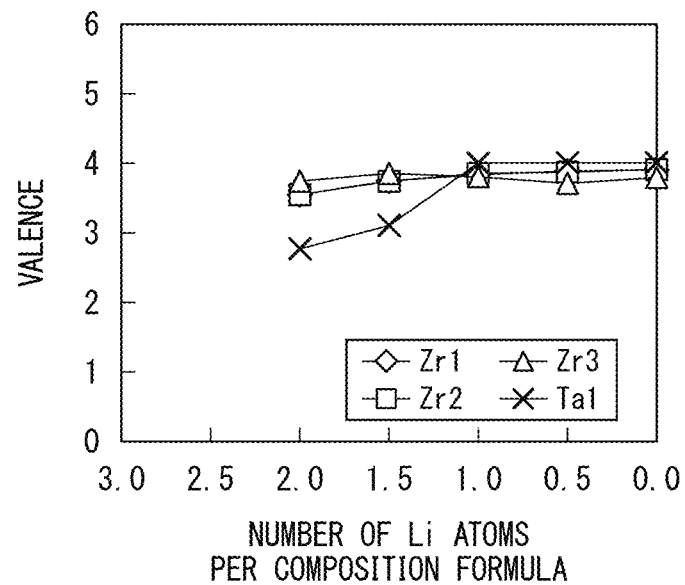
FIG. 7C is a diagram showing a measured change in characteristics of $Li_{1+0.5x}V_{0.5}Zr_{1.5}(PO_4)_3$ in which a part of zirconium in $LiZr_2(PO_4)_3$ is substituted with tantalum.
Figure 7D:
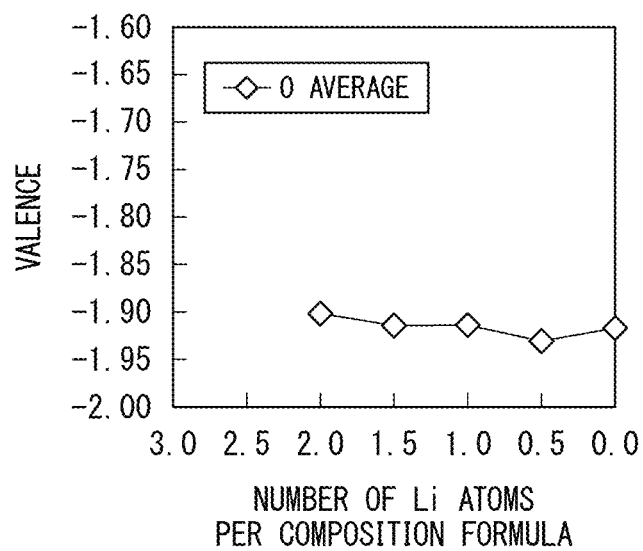
FIG. 7D is a diagram showing a measured change in characteristics of $Li_{1+0.5x}V_{0.5}Zr_{1.5}(PO_4)_3$ in which a part of zirconium in $LiZr_2(PO_4)_3$ is substituted with tantalum.

In Example 1-2, changes in characteristics of $Li_{1+0.5x}Ta_{0.5}Zr_{1.5}(PO_4)_3$ in which a part of zirconium of $LiZr_2(PO_4)_3$ was substituted with tantalum were measured. The results are shown in FIGS. 7A to 7D. FIG. 7A is a diagram showing changes in potential when the number of Li atoms per composition formula changed, FIG. 7B is a diagram showing a size of a HOMO-LUMO gap of the solid electrolyte with respect to the number of Li atoms per composition formula, FIG. 7C is a diagram showing changes in valences of zirconium and tantalum contained in the solid electrolyte when the number of Li atoms per composition formula changed, and FIG. 7D is a diagram showing changes in valence of oxygen contained in the solid electrolyte when the number of Li atoms per composition formula changed.

As shown in FIG. 7B, the solid electrolyte maintained electronic insulation within a range of the number of Li atoms from about 0.1 to about 1.7 in a case in which a part of zirconium is substituted with tantalum. This was able to be confirmed from the fact that the valences of zirconium and oxygen shown in FIGS. 7C and 7D did not greatly change with respect to variations in the number of Li atoms.

Example 1-3

Figure 8A:
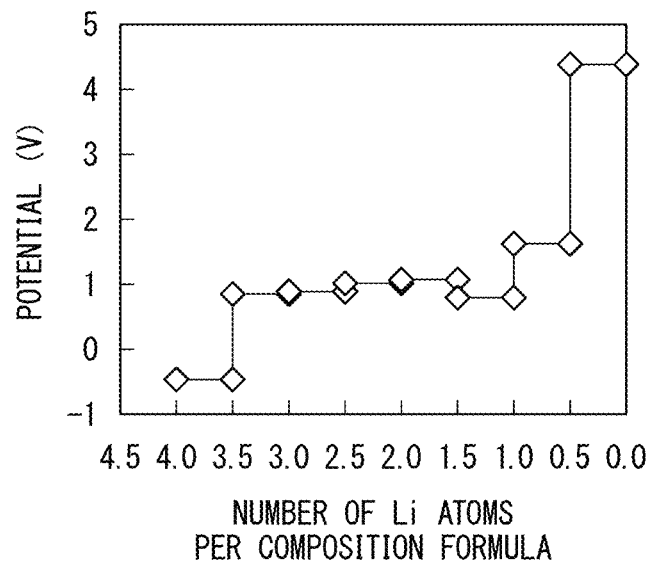
FIG. 8A is a diagram showing a measured change in characteristics of $Li_{1+0.5x}Zr_2W_{0.5}P_{2.5}O_{12}$ in which a part of phosphorous in $LiZr_2(PO_4)_3$ is substituted with tungsten.
Figure 8B:
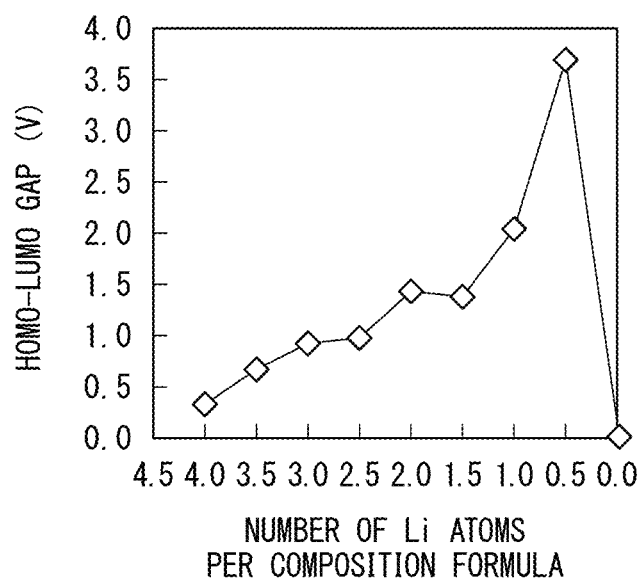
FIG. 8B is a diagram showing a measured change in characteristics of $Li_{1+0.5x}Zr_2W_{0.5}P_{2.5}O_{12}$ in which a part of phosphorous in $LiZr_2(PO_4)_3$ is substituted with tungsten.
Figure 8C:
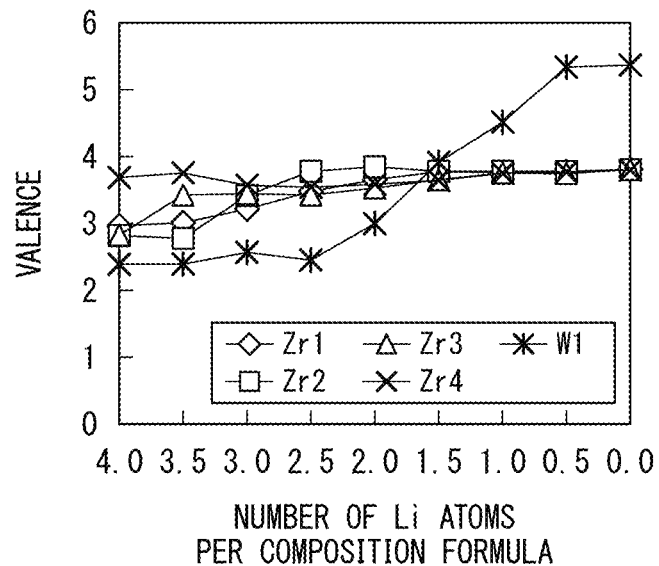
FIG. 8C is a diagram showing a measured change in characteristics of $Li_{1+0.5x}Zr_2W_{0.5}P_{2.5}O_{12}$ in which a part of phosphorous in $LiZr_2(PO_4)_3$ is substituted with tungsten.
Figure 8D:
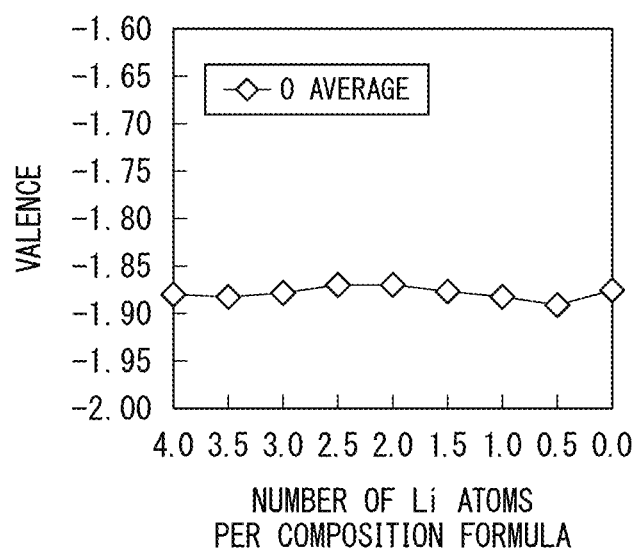
FIG. 8D is a diagram showing a measured change in characteristics of $Li_{1+0.5x}Zr_2W_{0.5}P_{2.5}O_{12}$ in which a part of phosphorous in $LiZr_2(PO_4)_3$ is substituted with tungsten.

In Example 1-3, changes in characteristics of $Li_{1+0.5x}Zr_2W_{0.5}PO_{2.5}O_{12}$ in which a part of phosphorus of $LiZr_2(PO_4)_3$ was substituted with tungsten were measured. The results are shown in FIGS. 8A to 8D. FIG. 8A shows a diagram showing changes in potential when the number of Li atoms per composition formula changed, FIG. 8B is a diagram showing a size of a HOMO-LUMO gap of the solid electrolyte with respect to the number of Li atoms per composition formula, FIG. 8C is a diagram showing changes in valences of zirconium and tungsten contained in the solid electrolyte when the number of Li atoms per composition formula changed, and FIG. 8D is a diagram showing a change in valence of oxygen contained in the solid electrolyte when the number of Li atoms changed.

As shown in FIG. 8B, the solid electrolyte maintained electronic insulation within a range of the number of Li atoms from about 0.2 to about 3.8 in a case in which a part of phosphorous was substituted with tungsten. This was also confirmed from the fact that the valences of zirconium and oxygen shown in FIGS. 8C and 8D did not greatly change with respect to variations in the number of Li atoms.

Example 1-4

Figure 9A:
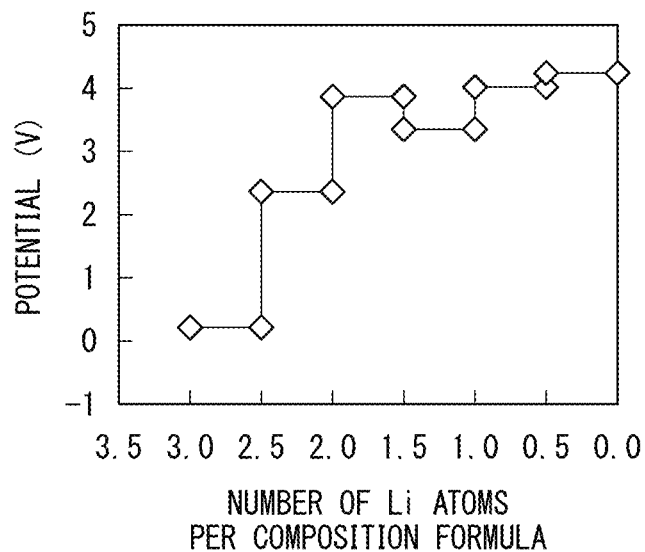
FIG. 9A is a diagram showing a measured change in characteristics of $Li_{1+0.5x}Zr_2W_{0.5}P_{2.5}O_{12}$ in which a part of phosphorous in $LiZr_2(PO_4)_3$ is substituted with manganese.
Figure 9B:
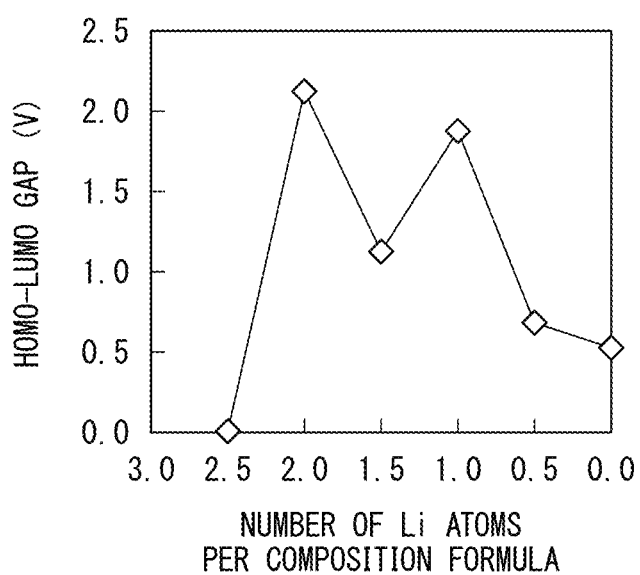
FIG. 9B is a diagram showing a measured change in characteristics of $Li_{1+0.5x}Zr_2W_{0.5}P_{2.5}O_{12}$ in which a part of phosphorous in $LiZr_2(PO_4)_3$ is substituted with manganese.
Figure 9C:
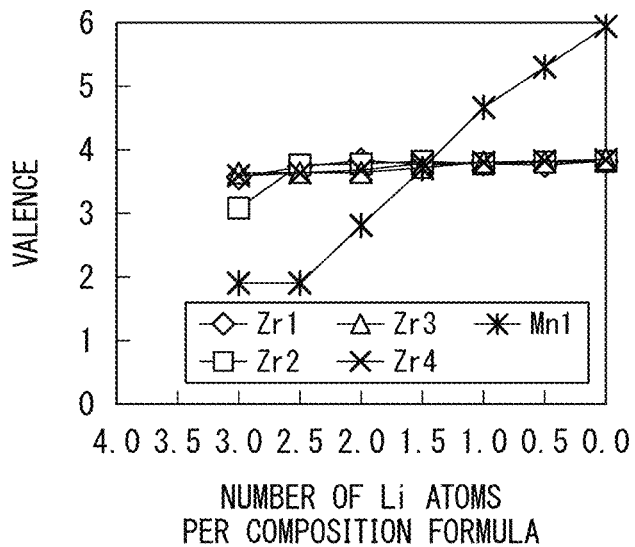
FIG. 9C is a diagram showing a measured change in characteristics of $Li_{1+0.5x}Zr_2W_{0.5}P_{2.5}O_{12}$ in which a part of phosphorous in $LiZr_2(PO_4)_3$ is substituted with manganese.
Figure 9D:
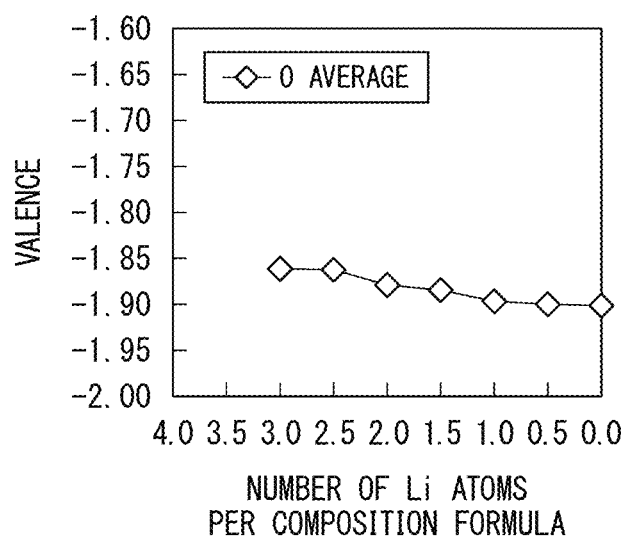
FIG. 9D is a diagram showing a measured change in characteristics of $Li_{1+0.5x}Zr_2W_{0.5}P_{2.5}O_{12}$ in which a part of phosphorous in $LiZr_2(PO_4)_3$ is substituted with manganese.
Figure 10A:
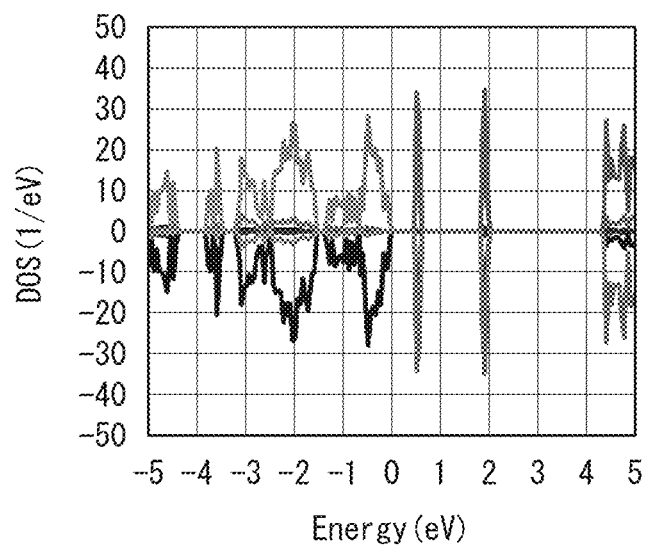
FIG. 10A is a diagram showing a state density distribution of electrons per a number of Li atoms.
Figure 10B:
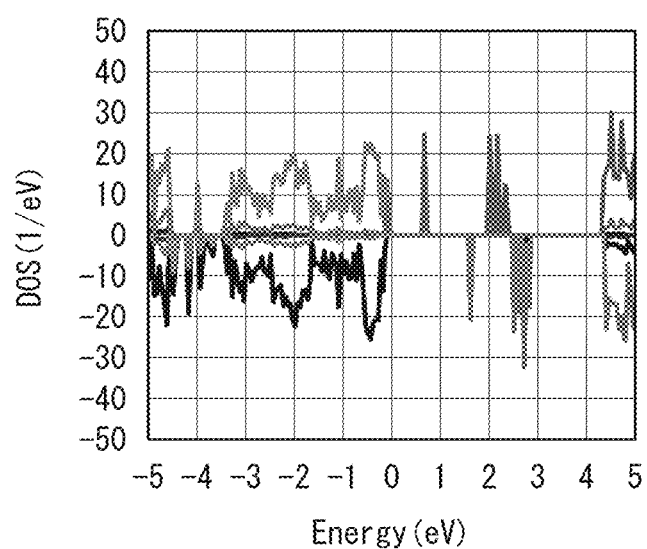
FIG. 10B is a diagram showing a state density distribution of electrons per a number of Li atoms.
Figure 10C:
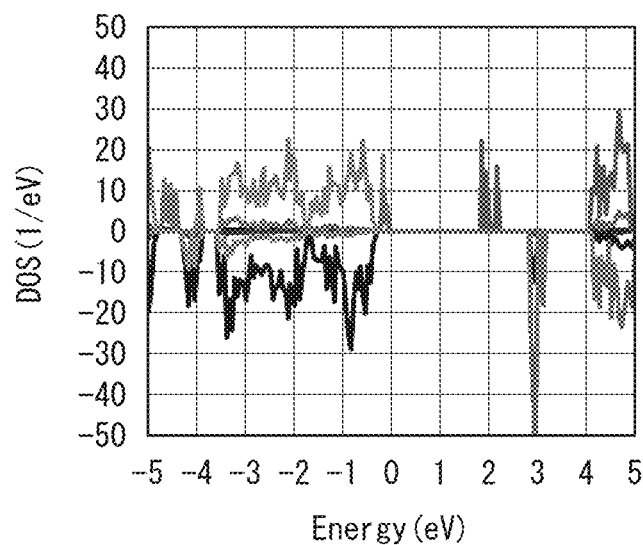
FIG. 10C is a diagram showing a state density distribution of electrons per a number of Li atoms.
Figure 10D:
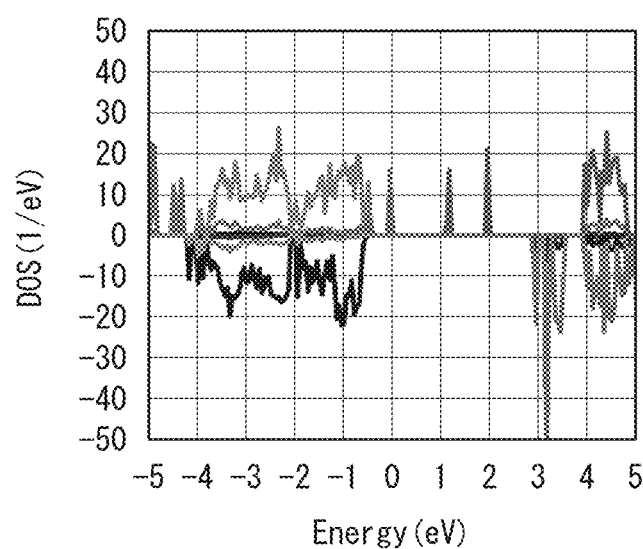
FIG. 10D is a diagram showing a state density distribution of electrons per a number of Li atoms.
Figure 11A:
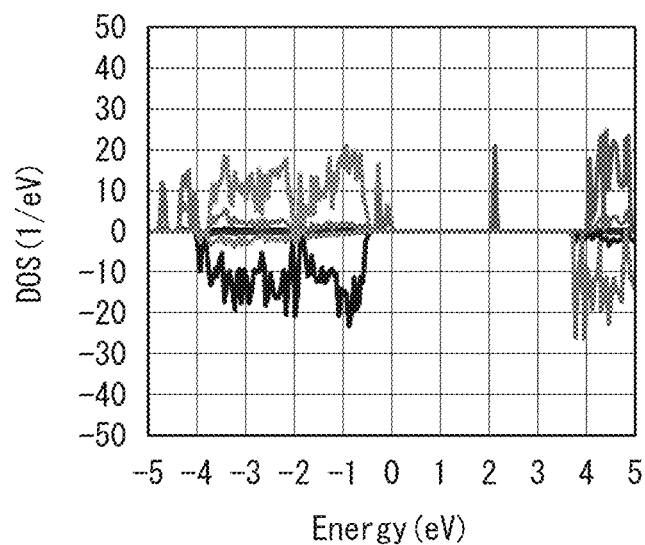
FIG. 11A is a diagram showing a state density distribution of electrons per a number of Li atoms.
Figure 11B:
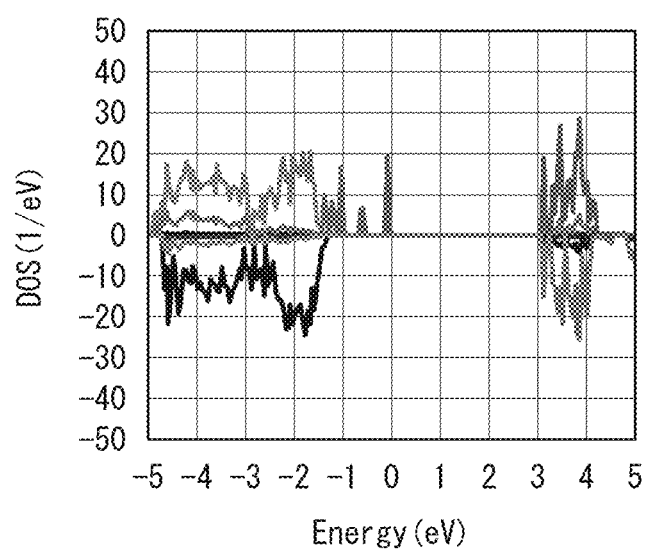
FIG. 11B is a diagram showing a state density distribution of electrons per a number of Li atoms.
Figure 11C:
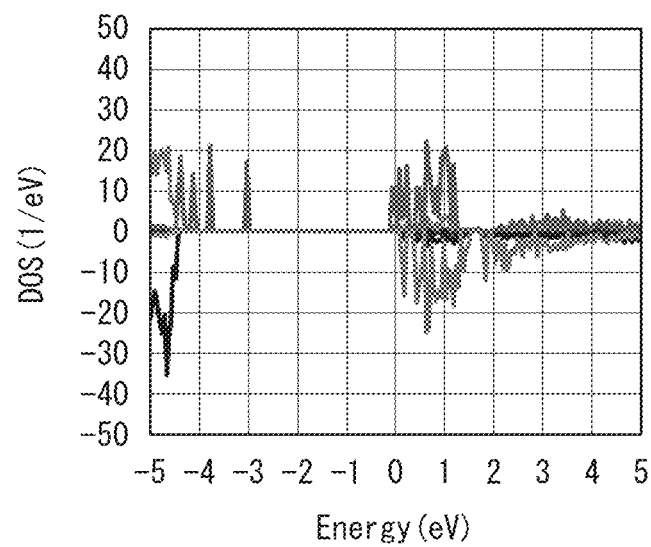
FIG. 11C is a diagram showing a state density distribution of electrons per a number of Li atoms.

In Example 1-4, changes in characteristics of $Li_{1+0.5x}Zr_2Mn_{0.5}P_{2.5}O_{12}$ in which a part of phosphorous of $LiZr_2(PO_4)_3$ was substituted with manganese were measured. The results are shown in FIGS. 9A to 9D. FIG. 9A is a diagram showing a change in potential when the number of Li atoms per composition formula changed, FIG. 9B is a diagram showing a size of a HOMO-LUMO gap of the solid electrolyte with respect to the number of Li atoms per composition formula, FIG. 9C is a diagram showing changes in valences of zirconium and manganese contained in the solid electrolyte when the number of Li atoms per composition formula changed, and FIG. 9D is a diagram showing a change in valence of oxygen contained in the solid electrolyte when the number of Li atoms changed.

As shown in FIG. 9B, the solid electrolyte maintained electronic insulation within a range of the number of Li atoms from about 0 to about 2.3 in a case in which a part of phosphorous was substituted with manganese. This was also confirmed from the fact that the valences of zirconium and oxygen shown in FIGS. 9C and 9D did not greatly change with respect to variations in the number of Li atoms.

When a part of phosphorus or zirconium in $LiZr_2(PO_4)_3$ was substituted with an element with a variable valence as described above, the solid electrolytes were able to maintain electronic insulation within wide ranges regardless of large variations in numbers of Li in any of the cases unlike the cases of the substitution with the typical elements shown in FIGS. 2A to 2D.

The density of states (DOS) of electrons when the numbers of Li were set to 0, 0.5, 1.0, 1.5, 2.0, 2.5, and 3.0 in a case in which $Li_xZr_2Mn_{0.5}P_{2.5}O_{12}$ in Example 1-4 was used is shown in FIGS. 10A to 10D and 11A to 11C, respectively.

It was recognized that the electrons in the energy level derived from oxygen was not used and electronic insulation was maintained when the number of Li atoms was 0 to about 2.5 by the occupied impurity level being present in the band gap. When it is possible to maintain electronic insulation until the number of Li became 0, Li is not desorbed any more, oxidation that accompanied desorption of Li also do not occur, and the upper limit of the potential window thus become significantly large.

"Band Structure of Solid Electrolyte"

As described above, all the solid electrolyte described in Examples 1-1 to 1-4 were able to maintain electronic insulation within wide ranges regardless of changes in the numbers of Li. Meanwhile, ranges of Li in which the solid electrolytes were able to maintain electronic insulation differed depending on each of the materials. In order to examine the differences, how many times as many unoccupied impurity levels and occupied impurity levels were formed in the band gaps as the substituting amount of the substitution element through substitution with the substituting element was measured using a Vienna Ab initio Simulation Package (VASP). The results are shown in Table 1.

TABLE 1

| | Substitution site | Substituting element | Multiple of constituent level with respect to amount of substitution of subsituting element | |
|---|---|---|---|---|
| | | | Occupied impurity level | Unoccupied impurity level |
| Example 2-1 | Zr | Ta | 1 | 1 |
| Example 2-2 | P | Cr | 1 | 1 |
| Example 2-3 | P | Mn | 2 | 3 |
| Example 2-4 | P | Fe | 2 | 3 |
| Example 2-5 | P | Ge | 1 | 1 |
| Example 2-6 | P | Se | 1 | 2 |
| Example 2-7 | P | Te | 1 | 3 |
| Example 2-8 | P | W | 1 | 5 |

"Actual Measurement of Solid Electrolyte"

Samples (sintered tablets of solid electrolytes) other than the solid electrolytes in Examples 1-1 to 1-5 were produced, and the numbers of occupied impurity levels, electronic conductivity, and upper limits of potential windows thereof were measured. Details of the compositions of the respective samples and the measurement results are shown in Table 2.

TABLE 2

| | yTa | zCr | zW | zMn | zFe | zGa | zSe | zTe | x (number of Li) | y | z | Number of occupied impurity levels | Electronic conductivity (S/m) | Upper limit of potential window |
|---|---|---|---|---|---|---|---|---|---|---|---|---|---|---|
| Example 3-1 | 0.2 | 0.8 | 0.0 | 0.0 | 0.0 | 0.0 | 0.0 | 0.0 | 1.0 | 0.2 | 0.8 | 1.0 | 7.7E−11 | 10 V or more |
| Comparative Example 3-1 | 0.2 | 0.7 | 0.0 | 0.0 | 0.0 | 0.0 | 0.0 | 0.0 | 1.0 | 0.2 | 0.7 | 0.9 | 3.3E−11 | 4.96 V |
| Comparative Example 3-2 | 0.2 | 0.8 | 0.0 | 0.0 | 0.0 | 0.0 | 0.0 | 0.0 | 2.1 | 0.2 | 0.8 | 2.1 | 7.7E−09 | 10 V or more |

TABLE 2-continued

| | yTa | zCr | zW | zMn | zFe | zGa | zSe | zTe | x (number of Li) | y | z | Number of occupied impurity levels | Electronic conductivity (S/m) | Upper limit of potential window |
|---|---|---|---|---|---|---|---|---|---|---|---|---|---|---|
| Example 3-2 | 0.2 | 0.0 | 0.8 | 0.0 | 0.0 | 0.0 | 0.0 | 0.0 | 1.0 | 0.2 | 0.8 | 1.0 | 8.5E−11 | 10 V or more |
| Comparative Example 3-3 | 0.2 | 0.0 | 0.7 | 0.0 | 0.0 | 0.0 | 0.0 | 0.0 | 1.0 | 0.2 | 0.7 | 0.9 | 1.4E−11 | 4.66 V |
| Example 3-3 | 0.2 | 0.0 | 0.0 | 0.4 | 0.0 | 0.0 | 0.0 | 0.0 | 1.0 | 0.2 | 0.4 | 1.0 | 5.5E−11 | 10 V or more |
| Comparative Example 3-4 | 0.2 | 0.0 | 0.0 | 0.3 | 0.0 | 0.0 | 0.0 | 0.0 | 1.0 | 0.2 | 0.3 | 0.8 | 3.4E−11 | 4.75 V |
| Comparative Example 3-5 | 0.2 | 0.0 | 0.0 | 0.4 | 0.0 | 0.0 | 0.0 | 0.0 | 2.5 | 0.2 | 0.4 | 2.5 | 5.8E−09 | 10 V or more |
| Example 3-4 | 0.2 | 0.0 | 0.0 | 0.0 | 0.4 | 0.0 | 0.0 | 0.0 | 1.0 | 0.2 | 0.4 | 1.0 | 5.7E−11 | 10 V or more |
| Comparative Example 3-6 | 0.2 | 0.0 | 0.0 | 0.0 | 0.3 | 0.0 | 0.0 | 0.0 | 1.0 | 0.2 | 0.3 | 0.8 | 4.6E−11 | 4.66 V |
| Comparative Example 3-7 | 0.2 | 0.0 | 0.0 | 0.0 | 0.4 | 0.0 | 0.0 | 0.0 | 2.5 | 0.2 | 0.4 | 2.5 | 8.6E−09 | 10 V or more |
| Example 3-5 | 0.2 | 0.0 | 0.0 | 0.0 | 0.0 | 0.8 | 0.0 | 0.0 | 1.0 | 0.2 | 0.8 | 1.0 | 4.2E−11 | 10 V or more |
| Comparative Example 3-8 | 0.2 | 0.0 | 0.0 | 0.0 | 0.0 | 0.7 | 0.0 | 0.0 | 1.0 | 0.2 | 0.7 | 0.9 | 4.7E−11 | 4.94 V |
| Comparative Example 3-9 | 0.2 | 0.0 | 0.0 | 0.0 | 0.0 | 0.8 | 0.0 | 0.0 | 2.1 | 0.2 | 0.8 | 2.1 | 2.1E−09 | 10 V or more |
| Example 3-6 | 0.2 | 0.0 | 0.0 | 0.0 | 0.0 | 0.0 | 0.8 | 0.0 | 1.0 | 0.2 | 0.8 | 1.0 | 8.1E−11 | 10 V or more |
| Comparative Example 3-10 | 0.2 | 0.0 | 0.0 | 0.0 | 0.0 | 0.0 | 0.7 | 0.0 | 1.0 | 0.2 | 0.7 | 0.9 | 1.0E−11 | 4.90 V |
| Comparative Example 3-11 | 0.2 | 0.0 | 0.0 | 0.0 | 0.0 | 0.0 | 0.8 | 0.0 | 2.9 | 0.2 | 0.8 | 2.9 | 9.3E−09 | 10 V or more |
| Example 3-7 | 0.2 | 0.0 | 0.0 | 0.0 | 0.0 | 0.0 | 0.0 | 0.8 | 1.0 | 0.2 | 0.8 | 1.0 | 3.8E−11 | 10 V or more |
| Comparative Example 3-12 | 0.2 | 0.0 | 0.0 | 0.0 | 0.0 | 0.0 | 0.0 | 0.7 | 1.0 | 0.2 | 0.7 | 0.9 | 7.4E−11 | 4.54 V |
| Example 3-8 | 0.0 | 0.5 | 0.5 | 0.0 | 0.0 | 0.0 | 0.0 | 0.0 | 1.0 | 0 | 1 | 1.0 | 4.2E−11 | 10 V or more |
| Example 3-9 | 0.0 | 0.5 | 0.0 | 0.3 | 0.0 | 0.0 | 0.0 | 0.0 | 1.0 | 0 | 0.8 | 1.1 | 6.6E−11 | 10 V or more |

The solid electrolytes in Examples 3-1 to 3-9 and Comparative Examples 3-1 to 3-12 are represented as $Li_xTa_yZr_{2-y}M_zP_{3-x}O_{12}$. M is at least one selected from the group consisting of Cr, W, Mn, Fe, Ge, Se, and Te. yTa, zCr, zW, zMn, zFe, zGe, zSe, and zTe in Table 2 represent amounts of Ta, Cr, W, Mn, Fe, Ge, Se, and Te, respectively.

The electronic conductivity was calculated using results of measurement performed by producing sintered bodies of the solid electrolytes and measuring values of currents flowing when a voltage of 1 V was applied to the sintered body.

Potentials at a timing at which oxidation currents of equal to or greater than 10 μA/cm² flowed when a potential was caused to be swept (1 mV/sec) within a range of 1 V to 10 V (vsLi/Li$^+$) were assumed to be upper limits of potential windows.

It was recognized that the upper limits of the potential windows were as large as 10 V or more when the numbers of occupied impurity levels per composition formula were equal to or greater than the numbers of Li atoms per composition formula regardless of the elements with which substitution was performed (Examples 3-1 to 3-9). On the contrary, it was recognized that in a case in which the numbers of occupied impurity levels per composition formula were smaller than the numbers of Li atoms per composition formula (Comparative Examples 3-1, 3-3, 3-6, 3-8, 3-10, and 3-12), the upper limits of the potential windows were below the halves of them in Examples 3-1 to 3-9.

On the basis of the aforementioned results, it was considered that all the holes generated by Li coming off from the solid electrolytes were trapped by the occupied impurity levels since the occupied impurity levels were present in the band gaps such that the numbers of the occupied impurity levels were greater than the upper limits of the numbers of Li in the solid electrolytes. Also, it was considered that the solid electrolytes included in the all-solid secondary batteries maintained electronic insulation. The results significantly corresponded to the results of the simulation.

In order to confirm that there were effects of the invention for substances other than a zirconium phosphate-based and lithium-containing oxide, sintered tablets of $Li_{0.35}La_{0.55}TiO_3$, $NaZr_2P_3O_{12}$, $Mg_{0.5}Zr_2P_3O_{12}$, and solid electrolytes obtained therefrom through substitution with elements were produced, and the numbers of occupied impurity levels, electronic conductivity, and upper limits of potential windows thereof were measured. Details of composition of the respective samples and measurement results are shown in Table 3.

TABLE 3

| | | Number of operating ions | Amount of charge retention of operating ions | Number of occupied impurity levels | Electronic conductivity (S/cm) | Upper limit of potential window |
|---|---|---|---|---|---|---|
| Comparative Example 4-1 | $Li_{0.35}La_{0.55}TiO_3$ | 0.35 | 0.35 | 0 | 8.40E−11 | 4.97 V |
| Example 4-1 | $Li_{0.35}La_{0.55}Ti_{0.65}Ta_{0.35}O_3$ | 0.35 | 0.35 | 0.35 | 6.20E−11 | 10 V or more |
| Comparative Example 4-2 | $NaZr_2P_3O_{12}$ | 1 | 1 | 0 | 5.20E−11 | 4.51 V |

TABLE 3-continued

|  |  | Number of operating ions | Amount of charge retention of operating ions | Number of occupied impurity levels | Electronic conductivity (S/cm) | Upper limit of potential window |
|---|---|---|---|---|---|---|
| Example 4-2 | $NaTa_{0.2}Zr_{1.8}Mn_{3.4}P_{2.6}O_{12}$ | 1 | 1 | 1 | 1.00E−11 | 10 V or more |
| Comparative Example 4-3 | $Mg_{0.5}Zr_2P_3O_{12}$ | 0.5 | 1 | 0 | 4.60E−11 | 4.92 V |
| Example 4-3 | $Mg_{0.5}T_{0.2}Zr_{1.8}Mn_{0.4}P_{2.6}O_{12}$ | 0.5 | 1 | 1 | 5.00E−11 | 10 V or more |

It was recognized that the upper limits of the potential windows were as large as 10 V or more when the numbers of occupied impurity levels per composition formula were equal to or greater than the amounts of charge retention of mobile ion per composition formula regardless of elements with which substitution was performed (Examples 4-1 to 4-3). On the contrary, it was recognized that the upper limits of the potential windows were below the halves of those in Examples 4-1 to 4-39 in the case in which the numbers of the occupied impurity levels per composition formula were smaller than the amounts of charge retention of mobile ions per composition formula (Comparative Examples 4-1 to 4-3).

On the basis of the aforementioned results, it was possible to maintain electronic insulation even if the entire mobile ions were desorbed as long as the occupied impurity levels were present in the band gaps such that the number of occupied impurity levels were greater than the amounts of charge retention of mobile ions in the solid electrolyte even in a case of substances other than the zirconium phosphate-based lithium-containing oxide, and it was considered that self-discharge of the all-solid secondary batteries using the solid electrolytes was prevented.

INDUSTRIAL APPLICABILITY

According to the invention, it is possible to provide a solid electrolyte with a potential window with a large upper limit.

REFERENCE SIGNS LIST

1 Positive electrode layer
1A Positive electrode current collector layer
1B Positive electrode active material layer
2 Negative electrode layer
2A Negative electrode current collector layer
2B Negative electrode active material layer
3 Solid electrolyte
3a Unoccupied impurity level
3b Occupied impurity level
4 Layered body
5, 6 Terminal electrode
10 All-solid secondary battery

What is claimed is:

1. A solid electrolyte made of a mobile ion-containing material having a composition represented by a formula $Li_xTa_yZr_{2-y}M_zP_{3-z}O_{12}$, wherein
M is at least one element selected from a group consisting of Cr, W, Mn, Fe, Se, and Te and substitutes P in the formula,
$0 \leq y < 1$, $0 < z < 1.5$, and $y+zCr+zW+zMn\times2+zFe\times2+zSe+zTe \geq 1$ are satisfied (except for y=0) in the formula, zCr, zW, zMn, zFe, zSe, and zTe being amounts of Cr, W, Mn, Fe, Se and Te, respectively,
$0 \leq 1-y-zCr-zW-zMn\times2zFe\times2-zSe-zTe \leq x \leq 1+y+zCr+zW\times5+zMn\times3+zFe\times3+zSe\times2+zTe\times3$ is satisfied in the formula,
$y+zCr+zW+zMn\times2+zFe\times2+zSe+zTe \geq 1$ is satisfied (except for y=0) in the formula,
an occupied impurity level is within a band gap of the mobile ion-containing material, the occupied impurity level being formed by the substitution of a part of elements of the mobile ion-containing material,
per the formula, a number of sites of the occupied impurity level is equal to or greater than a number of Li.

2. An all-solid secondary battery comprising:
the solid electrolyte according to claim 1.

3. The all-solid secondary battery according to claim 2, wherein a relative density of a pair of electrode layers and a solid electrolyte layer that has the solid electrolyte provided between the pair of electrode layers is equal to or greater than 80%.

4. The solid electrolyte according to claim 1,
wherein a part of zirconium of the solid electrolyte is substituted with Ta.

5. The solid electrolyte according to claim 1,
wherein the mobile ion sites are free of a substitution site.

* * * * *